United States Patent
Koyano et al.

(10) Patent No.: US 11,233,576 B2
(45) Date of Patent: Jan. 25, 2022

(54) OPTICAL COMMUNICATION DEVICE AND CONTROL METHOD

(71) Applicant: Mitsubishi Electric Corporation, Chiyoda-ku (JP)

(72) Inventors: Hiroyuki Koyano, Tokyo (JP); Takayasu Oura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/758,470

(22) PCT Filed: Dec. 12, 2017

(86) PCT No.: PCT/JP2017/044553
§ 371 (c)(1),
(2) Date: Apr. 23, 2020

(87) PCT Pub. No.: WO2019/116446
PCT Pub. Date: Jun. 20, 2019

(65) Prior Publication Data
US 2020/0252135 A1 Aug. 6, 2020

(51) Int. Cl.
*H04B 10/69* (2013.01)
*H04B 10/073* (2013.01)
*H04B 10/40* (2013.01)

(52) U.S. Cl.
CPC .......... *H04B 10/69* (2013.01); *H04B 10/073* (2013.01); *H04B 10/40* (2013.01)

(58) Field of Classification Search
CPC ....... H04B 10/69; H04B 10/40; H04B 10/073
See application file for complete search history.

(56) References Cited

U.S. PATENT DOCUMENTS

| 4,583,238 A | * | 4/1986 | Boisseau | H04L 7/0062 329/311 |
| 5,490,209 A | * | 2/1996 | Kennedy | H04L 25/0262 375/231 |
| 5,574,756 A | * | 11/1996 | Jeong | H03L 7/085 375/376 |
| 6,081,229 A | * | 6/2000 | Soliman | G01S 19/235 342/357.42 |

(Continued)

OTHER PUBLICATIONS

International Search Report dated Feb. 13, 2018 in PCT/JP2017/044553 filed on Dec. 12, 2017.

(Continued)

*Primary Examiner* — Tanya T Motsinger
(74) *Attorney, Agent, or Firm* — Oblon, McClelland, Maier & Neustadt, L.L.P.

(57) ABSTRACT

An optical communication device includes a conversion unit that receives an optical signal transmitted from a first optical communication device and converts the optical signal into a digital electric signal based on a clock signal, a clock switching unit that switches an oscillator generating the clock signal, and an operation mode control unit that detects an operation mode of the first optical communication device in the digital electric signal and commands the clock switching unit to perform switching from the oscillator generating the clock signal to an oscillator generating a clock signal at a frequency based on the operation mode of the first optical communication device.

10 Claims, 15 Drawing Sheets

(56) References Cited

U.S. PATENT DOCUMENTS

| | | | | |
|---|---|---|---|---|
| 6,272,452 | B1* | 8/2001 | Wu | G06F 13/105 |
| | | | | 703/24 |
| 6,356,583 | B1* | 3/2002 | Lee | H04L 25/05 |
| | | | | 375/220 |
| 7,336,729 | B2* | 2/2008 | Agazzi | H03M 1/0624 |
| | | | | 341/118 |
| 7,680,232 | B2* | 3/2010 | Shumarayev | H04L 7/0083 |
| | | | | 375/371 |
| 7,751,726 | B1* | 7/2010 | Gazzola | H04J 3/14 |
| | | | | 398/202 |
| 8,009,985 | B1* | 8/2011 | Roberts | H04L 1/0017 |
| | | | | 398/47 |
| 9,337,934 | B1* | 5/2016 | Agazzi | H04L 7/0075 |
| 9,608,647 | B1* | 3/2017 | Djahanshahi | H03B 5/124 |
| 2001/0015839 | A1 | 8/2001 | Koh et al. | |
| 2005/0111845 | A1* | 5/2005 | Nelson | H04B 10/672 |
| | | | | 398/138 |
| 2006/0133809 | A1* | 6/2006 | Chow | H04J 3/1694 |
| | | | | 398/66 |
| 2006/0239687 | A1* | 10/2006 | Gopinath | H04B 10/66 |
| | | | | 398/115 |
| 2007/0047970 | A1* | 3/2007 | Tsuji | H04L 7/02 |
| | | | | 398/198 |
| 2008/0101503 | A1* | 5/2008 | Gupta | H04W 56/0015 |
| | | | | 375/338 |
| 2009/0047026 | A1* | 2/2009 | Luo | H04B 10/40 |
| | | | | 398/135 |
| 2009/0106577 | A1* | 4/2009 | Cherpantier | G06F 1/08 |
| | | | | 713/600 |
| 2009/0128197 | A1* | 5/2009 | Tsuyoshi | H03J 1/0075 |
| | | | | 327/106 |
| 2010/0098411 | A1* | 4/2010 | Nakashima | H04B 10/65 |
| | | | | 398/25 |
| 2011/0090017 | A1* | 4/2011 | Chen | H03B 5/1215 |
| | | | | 331/117 FE |
| 2011/0145622 | A1* | 6/2011 | Senohrabek | G06F 13/4022 |
| | | | | 713/400 |
| 2011/0249775 | A1* | 10/2011 | Koyanagi | H04L 7/033 |
| | | | | 375/340 |
| 2012/0163831 | A1* | 6/2012 | Eiselt | H04B 10/516 |
| | | | | 398/185 |
| 2012/0219288 | A1 | 8/2012 | Roberts et al. | |
| 2012/0269513 | A1* | 10/2012 | Abe | H04B 10/69 |
| | | | | 398/65 |
| 2012/0275334 | A1* | 11/2012 | Hamada | H04W 74/085 |
| | | | | 370/252 |
| 2014/0321471 | A1* | 10/2014 | Lau | H04L 49/3027 |
| | | | | 370/401 |
| 2016/0127519 | A1* | 5/2016 | Hanusch | H04L 5/0055 |
| | | | | 370/252 |
| 2016/0218625 | A1* | 7/2016 | Chen | H02M 1/00 |
| 2016/0377711 | A1* | 12/2016 | Arage | G01S 7/285 |
| | | | | 342/118 |
| 2017/0201813 | A1* | 7/2017 | Sahni | H04B 10/801 |
| 2017/0237516 | A1* | 8/2017 | Welch | H04J 14/02 |
| | | | | 398/79 |
| 2018/0198547 | A1* | 7/2018 | Mehrvar | H04B 10/616 |
| 2019/0165926 | A1* | 5/2019 | Stojanovic | H04B 10/69 |
| 2020/0033691 | A1* | 1/2020 | Enoki | H04B 10/516 |
| 2020/0076508 | A1* | 3/2020 | Jia | H04J 14/02 |
| 2020/0252135 | A1* | 8/2020 | Koyano | H04B 10/69 |

OTHER PUBLICATIONS

Extended European Search Report dated Nov. 27, 2020 in corresponding European Patent Application No. 17934526.9, 8 pages.

* cited by examiner

| OPERATION MODE TABLE | | | 151 |
|---|---|---|---|
| No. | BAUD RATE | MODULATION SCHEME | OPERATION MODE NOTIFICATION SIGNAL |
| 1 | 32 Gbaud | QPSK | 00 |
| ... | ... | ... | ... |
| 4 | 64 Gbaud | 16 QAM | 11 |

OPTICAL COMMUNICATION DEVICE AND CONTROL METHOD

TECHNICAL FIELD

The present invention relates to an optical communication device and a control method.

BACKGROUND ART

In recent years, high-speed data communication and high-capacity data communication service are being required of optical communication systems. In the optical communication systems, the transmission rate is increasing to 40 Gbps, 100 Gbps, 200 Gbps and 400 Gbps. An optical transceiver capable of supporting a plurality of transmission rates is being requested. There are cases where the transmission rate or a modulation scheme is expressed as an operation mode.

In an optical communication system, the operation mode of an optical transceiver having a plurality of operation modes can be changed by controlling the operation mode from the outside. For example, in the optical communication system, an external device is connected to the optical transceiver. The operation mode of the optical transceiver is changed by control performed by the external device. Further, the external device is capable of setting two optical transceivers to the same operation mode. For example, in the optical communication system, the external device is connected to each of the two optical transceivers. Each of the two optical transceivers is set to the same operation mode by the control by the external device. The two optical transceivers enter a state in which data transmission and reception can be performed normally by being set to the same operation mode. The state in which data transmission and reception can be performed normally is expressed as a connection establishment state.

In an optical communication system required to perform communication with high secrecy, the system has to be constructed without employing the method of controlling the operation mode from the outside. In such cases where the control of the operation mode of an optical transceiver from the outside becomes impossible, it is difficult to set the same operation mode on two optical transceivers and thereby bring the two optical transceivers to the connection establishment state.

Here, a technology for synchronizing transmission rates has been proposed (see Patent Reference 1, for example). In the Patent Reference 1, for example, two optical transceivers communicate test signals, each representing a transmission rate, with each other. When the transmission rate represented by a test signal and an initially set transmission rate differ from each other (i.e., when the transmission rates are out of sync), the optical transceiver that received the test signal transmits a test signal representing a different transmission rate to the optical transceiver as the transmission source of the former test signal. As above, the optical transceiver receiving the test signal repeats transmitting a test signal until the transmission rates are synchronized.

PRIOR ART REFERENCE

Patent Reference

Patent Reference 1: Japanese Patent Application Publication No. 2005-229298

SUMMARY OF THE INVENTION

Problem to be Solved by the Invention

In the above-described technology, as the number of operation modes such as transmission rates increases, the transmission of a test signal by an optical transceiver is repeated until the transmission rates are synchronized, and thus the number of times of the test signal transmission by an optical transceiver increases, and accordingly, the time until entering the connection establishment state becomes longer.

An object of the present invention is to bring an optical communication device to the connection establishment state in a short time.

Means for Solving the Problem

An optical communication device according to an aspect of the present invention is provided. An optical communication device that communicates with a first optical communication device includes: a conversion unit that receives an optical signal transmitted from the first optical communication device and converts the optical signal into a digital electric signal based on a clock signal; a clock switching unit that switches an oscillator generating the clock signal; and an operation mode control unit that detects an operation mode of the first optical communication device in the digital electric signal and commands the clock switching unit to perform switching from the oscillator generating the clock signal to an oscillator generating a clock signal at a frequency based on the operation mode of the first optical communication device.

Effect of the Invention

According to the present invention, the optical communication device can be brought to the connection establishment state in a short time.

MODE FOR CARRYING OUT THE INVENTION

A description will be given below with reference to drawings. The following embodiments are just examples and modifications are possible within the scope of the present invention.

First Embodiment

Figure 1:
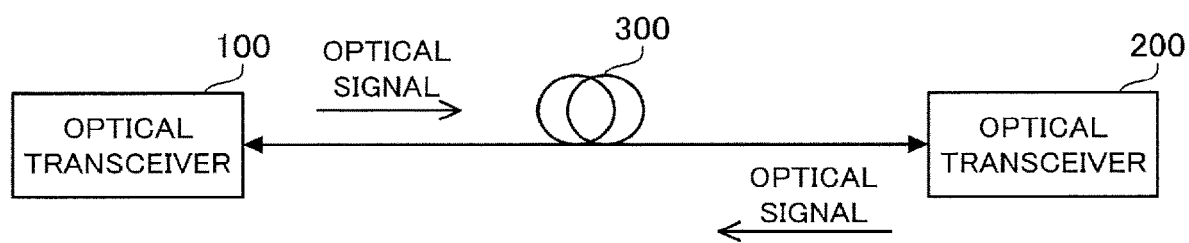
FIG. 1 is a diagram showing an optical communication system in a first embodiment.

FIG. 1 is a diagram showing an optical communication system in a first embodiment. The optical communication system includes an optical transceiver 100 and an optical transceiver 200. The optical transceiver 100 and the optical transceiver 200 transmit and receive optical signals via a transmission line 300. The optical transceivers may be referred to also as optical communication devices.

For example, the optical transceiver 100 is included in a first Wavelength Division Multiplexing (WDM) optical transmission device. The optical transceiver 200 is included in a second WDM optical transmission device. The first WDM optical transmission device and the second WDM optical transmission device transmit and receive optical signals.

Incidentally, the optical transceiver 100 or the optical transceiver 200 will be referred to also as a first optical communication device.

Next, a principal hardware configuration of the optical transceiver 100 will be described below.

Figure 2:
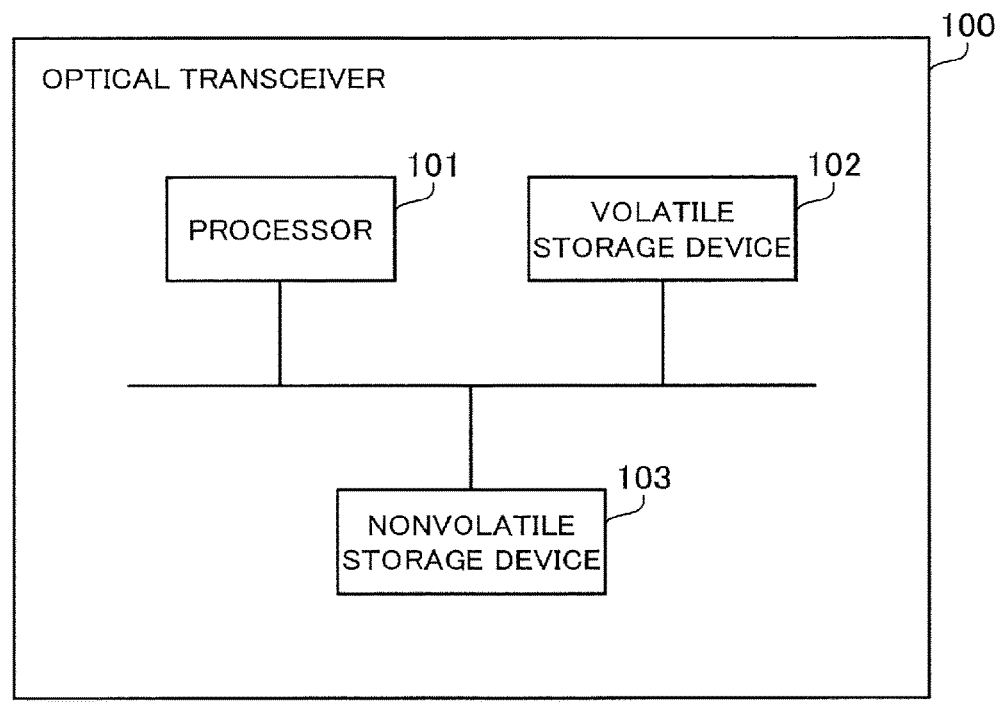
FIG. 2 is a diagram showing a principal hardware configuration of an optical transceiver in the first embodiment.

FIG. 2 is a diagram showing the principal hardware configuration of the optical transceiver in the first embodiment. The optical transceiver 100 includes a processor 101, a volatile storage device 102 and a nonvolatile storage device 103.

The processor 101 controls the whole of the optical transceiver 100. For example, the processor 101 is a Central Processing Unit (CPU), a Digital Signal Processor (DSP), a Field Programmable Gate Array (FPGA) or the like. The processor 101 may also be a multiprocessor that executes a plurality of processes in parallel. The optical transceiver 100 may be implemented either by processing circuitry or by software, firmware or a combination of software and firmware.

The volatile storage device 102 is a main storage device of the optical transceiver 100. For example, the volatile storage device 102 is a Random Access Memory (RAM). The nonvolatile storage device 103 is an auxiliary storage device of the optical transceiver 100. For example, the nonvolatile storage device 103 is a Solid State Drive (SSD) or the like.

The optical transceiver 200 has hardware similar to that of the optical transceiver 100.

Figure 3:
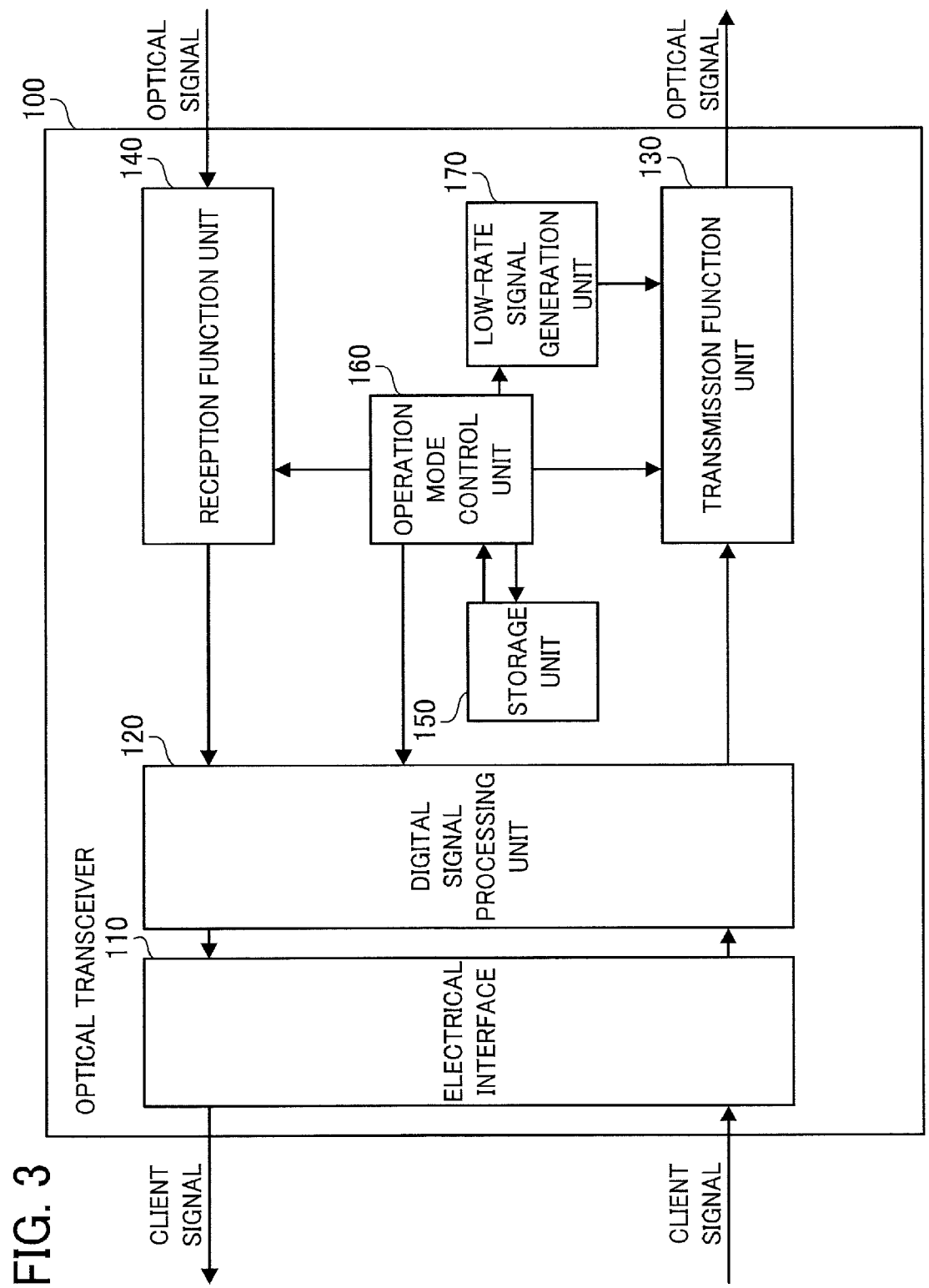
FIG. 3 is a functional block diagram showing a configuration of the optical transceiver in the first embodiment.

FIG. 3 is a functional block diagram showing a configuration of the optical transceiver in the first embodiment. The optical transceiver 100 includes an electrical interface 110, a digital signal processing unit 120, a transmission function unit 130, a reception function unit 140, a storage unit 150, an operation mode control unit 160 and a low-rate signal generation unit 170.

Part or all of the digital signal processing unit 120, the transmission function unit 130, the reception function unit 140, the operation mode control unit 160 and the low-rate signal generation unit 170 may be implemented by the processor 101. Further, part or all of the digital signal processing unit 120, the transmission function unit 130, the reception function unit 140, the operation mode control unit 160 and the low-rate signal generation unit 170 may be implemented as a module of a program executed by the processor 101, for example. The program is stored in the volatile storage device 102 or the nonvolatile storage device 103.

The storage unit 150 is implemented as a storage area secured in the volatile storage device 102 or the nonvolatile storage device 103.

The electrical interface 110 transmits and receives client signals. For example, the electrical interface 110 communicates client signals with a client device included in the first WDM optical transmission device.

The digital signal processing unit 120 performs digital signal processing on the client signal as a data signal. The transmission function unit 130 converts an electric signal into an optical signal. The reception function unit 140 converts an optical signal into an electric signal.

The storage unit 150 stores information regarding an operation mode. The operation mode will be explained in detail later. The operation mode control unit 160 controls the operation mode of the optical transceiver 100. The low-rate signal generation unit 170 generates a signal for notifying of the operation mode.

The optical transceiver 200 has functional blocks similar to those of the optical transceiver 100.

Next, information stored in the storage unit 150 will be described below.

Figure 4:
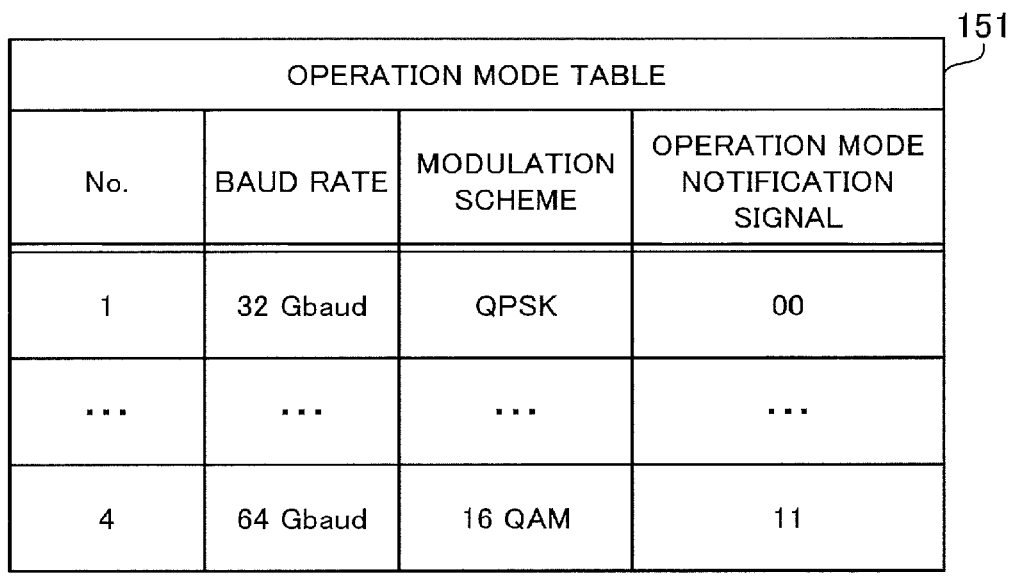
FIG. 4 is a diagram showing an operation mode table in the first embodiment.

FIG. 4 is a diagram showing an operation mode table in the first embodiment. The operation mode table 151 is stored in the storage unit 150. The operation mode table 151 includes columns of No. (i.e., item number), baud rate, modulation scheme and operation mode notification signal.

The column of No. indicates an identifier. Incidentally, it is assumed in the column of No. that the priority order becomes higher with the decrease in the number No. The column of baud rate indicates the baud rate. The column of modulation scheme indicates the modulation scheme. The column of operation mode notification signal indicates an identifier corresponding to an operation mode. Here, the operation mode means the baud rate and the modulation scheme. The operation mode may also be regarded as the baud rate.

Further, a storage unit of the optical transceiver 200 stores the same operation mode table as the operation mode table 151.

Incidentally, the optical transceiver 100 and the optical transceiver 200 are devices capable of supporting a plurality of operation modes.

Here, the storage unit 150 included in the optical transceiver 100 and the storage unit included in the optical transceiver 200 store a previously set operation mode. When the power of the optical transceiver 100 is turned on and started up (i.e., when the optical transceiver 100 starts up), the optical transceiver 100 transmits the operation mode stored in the storage unit 150 to the optical transceiver 200. When the power of the optical transceiver 200 is turned on and started up (i.e., when the optical transceiver 200 starts up), the optical transceiver 200 transmits the operation mode stored in the storage unit of the optical transceiver 200 to the optical transceiver 100. In other words, the optical transceiver 100 and the optical transceiver 200 communicate the operation modes with each other. Then, the optical transceiver 100 and the optical transceiver 200 synchronize the operation modes. How the operation modes are synchronized will be described in detail later.

Next, a transmission process executed by the optical transceivers will be described below. While the transmission process executed by the optical transceiver 200 will be described with reference to FIG. 5, the transmission process executed by the optical transceiver 100 is also the same process.

Figure 5:
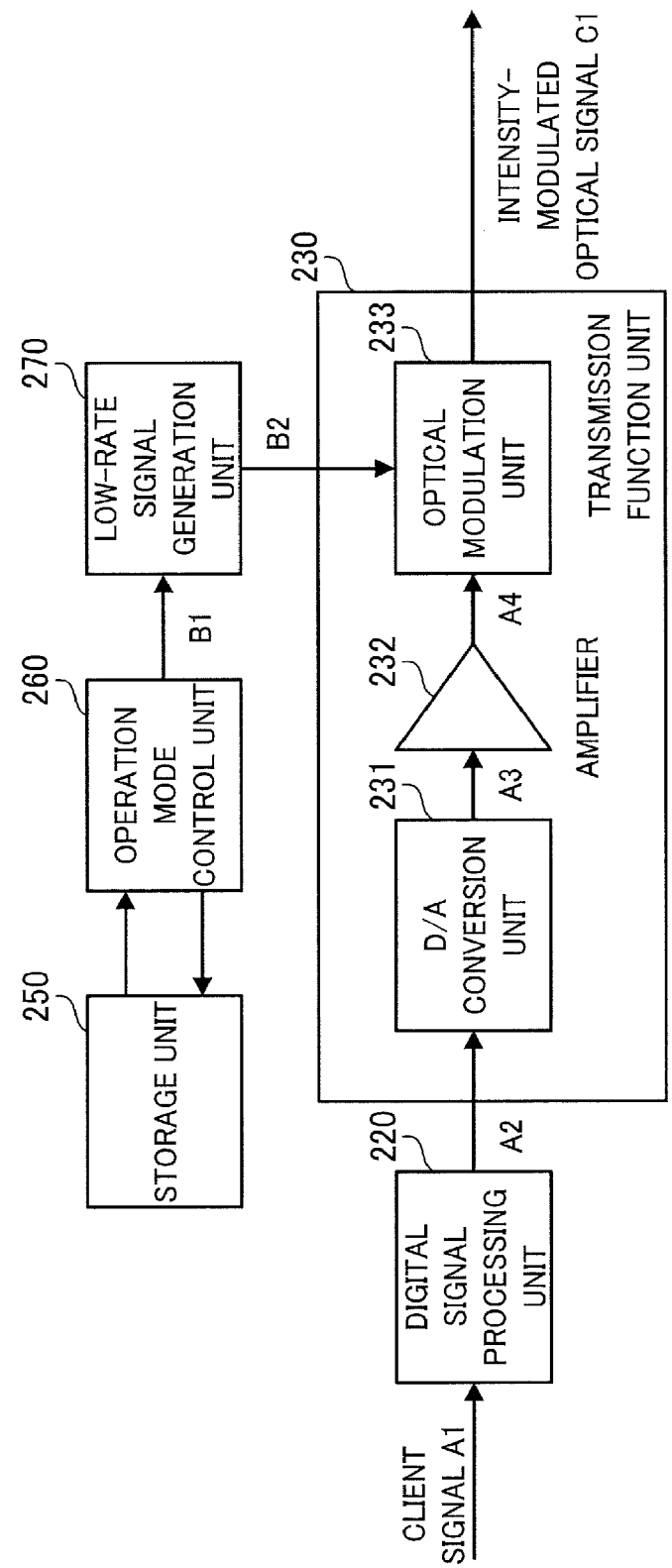
FIG. 5 is a diagram for explaining a transmission process in the first embodiment.

FIG. 5 is a diagram for explaining the transmission process in the first embodiment. The optical transceiver 200 includes a digital signal processing unit 220, a transmission function unit 230, a storage unit 250, an operation mode control unit 260 and a low-rate signal generation unit 270. Functions of the digital signal processing unit 220, the transmission function unit 230, the operation mode control unit 260 and the low-rate signal generation unit 270 are the same as the functions of the digital signal processing unit 120, the transmission function unit 130, the operation mode control unit 160 and the low-rate signal generation unit 170.

The transmission function unit 230 includes a Digital/Analog (D/A) conversion unit 231, an amplifier 232 and an optical modulation unit 233. Incidentally, the transmission function unit 130 similarly includes a D/A conversion unit, an amplifier and an optical modulation unit.

First, the transmission process executed by the optical transceiver 200 after entering the connection establishment state will be described.

The digital signal processing unit 220 receives a client signal A1. The digital signal processing unit 220 adds Forward Error Correction (FEC) to the client signal A1. The digital signal processing unit 220 transmits a client signal A2 with the added FEC to the D/A conversion unit 231.

The D/A conversion unit 231 converts the client signal A2 as a digital electric signal into an analog electric signal A3. The amplifier 232 amplifies the analog electric signal A3. The amplifier 232 transmits an analog electric signal A4 obtained by the amplification to the optical modulation unit 233. The optical modulation unit 233 converts the analog electric signal A4 into an optical signal. The optical modulation unit 233 transmits the optical signal to the optical transceiver 100. Further, the optical modulation unit 233 is capable of modulating the optical signal. For example, the optical modulation unit 233 modulates the intensity of the optical signal by using On Off Keying (OOK). The optical modulation unit 233 may transmit an intensity-modulated optical signal, obtained by modulating the intensity of the optical signal, to the optical transceiver 100.

Next, the transmission process executed by the optical transceiver 200 before entering the connection establishment state will be described. The transmission function unit 230 transmits information indicating the operation mode stored in the storage unit 250 to the optical transceiver 100. Details will be explained below.

The storage unit 250 stores a previously set operation mode B1. When the optical transceiver 200 is started up, the operation mode control unit 260 acquires the operation mode B1 from the storage unit 250. The operation mode control unit 260 transmits the operation mode B1 to the low-rate signal generation unit 270.

The low-rate signal generation unit 270 generates an operation mode notification signal B2 at a kHz frequency equivalent to the frequency of a dither signal (e.g., "frequency of some kHz" or "predetermined frequency on the order of kHz") based on the operation mode B1. The low-rate signal generation unit 270 outputs the operation mode notification signal B2 to a Direct Current (DC) bias port of the optical modulation unit 233. The optical modulation unit 233 generates an intensity-modulated optical signal C1 at the kHz frequency including the operation mode notification signal B2. The intensity-modulated optical signal C1 is an optical signal modulated by using OOK. The optical modulation unit 233 transmits the intensity-modulated optical signal C1 to the optical transceiver 100.

In cases where a low-frequency signal is superimposed on a client signal being a data signal, the modulation factor of the low-frequency signal has to be kept down to approximately several %. In the first embodiment, there is no restriction on the modulation factor since no low-frequency signal is superimposed on the client signal Next, a reception process executed by the optical transceivers will be described below. While the reception process executed by the optical transceiver 100 will be described with reference to FIG. 6, the reception process executed by the optical transceiver 200 is also the same process.

Figure 6:
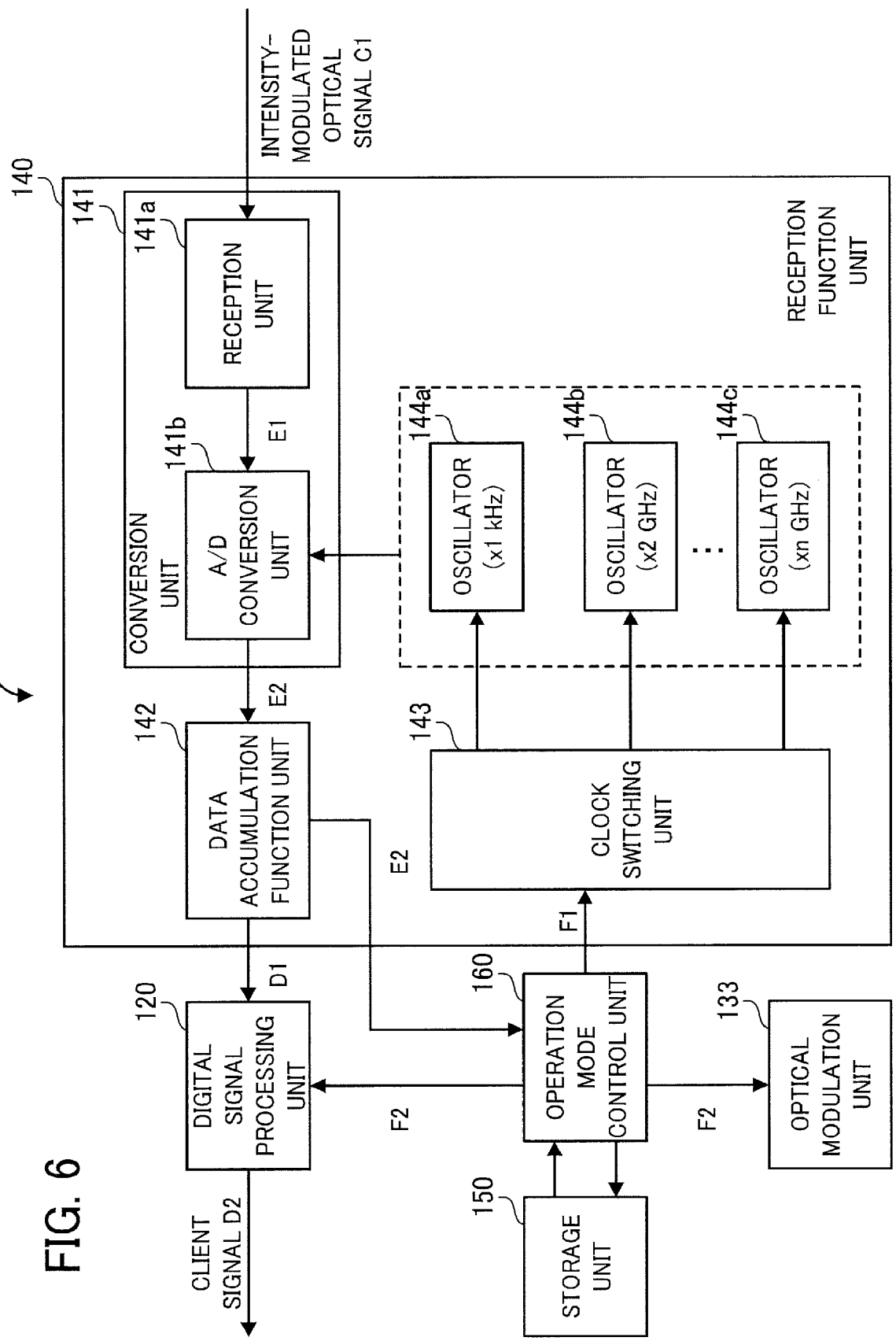
FIG. 6 is a diagram for explaining a reception process in the first embodiment.

FIG. 6 is a diagram for explaining the reception process in the first embodiment. The reception function unit 140 includes a conversion unit 141, a data accumulation function unit 142, a clock switching unit 143 and oscillators 144$a$, 144$b$ and 144$c$. Further, an optical modulation unit 133 is included in the transmission function unit 130.

The conversion unit 141 includes a reception unit 141$a$ and an A/D conversion unit 141$b$. The oscillator 144$a$ is a device that generates a clock signal at a frequency of x1 [kHz]. The oscillator 144$a$ is referred to also as a first oscillator. The frequency of x1 [kHz] is referred to also as a kHz frequency at a first numerical value. The frequency of x1 [kHz] may also be represented as a frequency in terms of kHz. The frequency of x1 [kHz], or the kHz frequency at the first numerical value, is a frequency within a range of 1 to 1000 [kHz]. Incidentally, the kHz frequency of the operation mode notification signal B2, the kHz frequency of the intensity-modulated optical signal C1, and the frequency of x1 [kHz] are the same as each other. The oscillator 144$b$ is a device that generates a clock signal at a frequency of x2 [GHz]. The oscillator 144$c$ is a device that generates a clock signal at a frequency of xn (n: integer larger than or equal to 3) [GHz]. The frequencies x1 to xn are frequencies different from each other.

Incidentally, a reception function unit included in the optical transceiver 200 similarly includes a conversion unit, a data accumulation function unit, a clock switching unit and oscillators. Further, a conversion unit included in the optical transceiver 200 includes a reception unit and an A/D conversion unit.

First, the reception process executed by the optical transceiver 100 after entering the connection establishment state will be described below.

The reception unit 141$a$ converts an optical signal or an intensity-modulated optical signal into an analog electric signal. The A/D conversion unit 141$b$ converts the analog electric signal into a digital electric signal. The data accumulation function unit 142 holds the digital electric signal.

The data accumulation function unit 142 transmits the digital electric signal D1 to the digital signal processing unit 120.

The clock switching unit 143 performs switching to an oscillator that generates a clock signal at a frequency based on the operation mode. Specifically, the clock switching unit 143 selects the oscillator generating the clock signal at the frequency based on the operation mode from the oscillators 144a, 144b and 144c. The clock switching unit 143 performs the switching to the selected oscillator. By the switching, the frequency of the clock signal is changed.

The digital signal processing unit 120 performs FEC decoding on the digital electric signal D1 and thereby extracts a client signal D2. The digital signal processing unit 120 transmits the client signal D2 to the electrical interface 110.

Next, the reception process executed by the optical transceiver 100 before entering the connection establishment state will be described below.

The conversion unit 141 receives the intensity-modulated optical signal C1 transmitted from the optical transceiver 200 and converts the intensity-modulated optical signal C1 into a digital electric signal E2 based on the clock signal. The function of the conversion unit 141 will be described in detail below by using the reception unit 141a and the A/D conversion unit 141b.

The reception unit 141a receives the intensity-modulated optical signal C1 at a kHz frequency from the optical transceiver 200. For this purpose, the clock switching unit 143 performs the switching to the oscillator 144a and activates the oscillator 144a. The oscillator 144a outputs the clock signal at x1 [kHz] to the A/D conversion unit 141b. As above, before entering the connection establishment state, the clock switching unit 143 invariably activates the oscillator 144a.

The reception unit 141a converts the intensity-modulated optical signal C1 including the operation mode notification signal B2 into an analog electric signal E1. The A/D conversion unit 141b converts the analog electric signal E1 into the digital electric signal E2 including the operation mode notification signal B2. The A/D conversion unit 141b transmits the digital electric signal E2 to the data accumulation function unit 142.

The data accumulation function unit 142 holds the digital electric signal E2. The data accumulation function unit 142 transmits the digital electric signal E2 to the operation mode control unit 160.

The operation mode control unit 160 detects the operation mode B1 of the optical transceiver 200 in the digital electric signal E2. Specifically, the operation mode control unit 160 detects the operation mode B1 based on the operation mode notification signal B2 by referring to the operation mode table 151.

For example, when the operation mode notification signal B2 indicates "00", the operation mode control unit 160 detects that the operation mode B1 is an operation mode in which the baud rate is "32 Gbaud" and the modulation scheme is "Quadrature Phase Shift Keying (QPSK)". The operation mode B1 is referred to as a first operation mode.

The operation mode control unit 160 commands the clock switching unit 143 to perform the switching to an oscillator that generates a clock signal at a frequency based on the first operation mode of the optical transceiver 200. Details will be explained below. The operation mode control unit 160 compares the operation mode previously set to the storage unit 150 with the first operation mode. The operation mode compared with the first operation mode is referred to as a second operation mode.

When the first operation mode and the second operation mode coincide with each other, the operation mode control unit 160 transmits information F1 to the clock switching unit 143. The information F1 is a baud rate. The baud rate is the same as the baud rate represented by the first operation mode and the second operation mode. The clock switching unit 143 selects an oscillator that generates a clock signal at a frequency based on the information F1 from the oscillators 144a, 144b and 144c. The clock switching unit 143 performs the switching to the selected oscillator. For example, the clock switching unit 143 switches the oscillator from the oscillator 144a to the oscillator 144b. The oscillator selected by the clock switching unit 143 outputs the clock signal to the A/D conversion unit 141b.

When the first operation mode and the second operation mode coincide with each other, the operation mode control unit 160 transmits information F2 to the digital signal processing unit 120. The information F2 is a modulation scheme. The modulation scheme is the same as the modulation scheme represented by the first operation mode and the second operation mode. The digital signal processing unit 120 changes a drive mode based on the information F2.

When the first operation mode and the second operation mode coincide with each other, the operation mode control unit 160 transmits the information F2 to the optical modulation unit 133. The optical modulation unit 133 changes the modulation scheme based on the information F2. For example, the optical modulation unit 133 changes the modulation scheme to QPSK or Quadrature Amplitude Modulation (QAM).

This brings the optical transceiver 100 and the optical transceiver 200 to the connection establishment state since their operation modes coincide with each other.

A case where the first operation mode and the second operation mode do not coincide with each other will be described in detail later.

Here, if the optical transceiver 100 receives an optical signal in a state in which the operation modes of the optical transceiver 100 and the optical transceiver 200 differ from each other, for example, the following situations occur: When the baud rates differ from each other, the clock synchronization cannot be established. When the modulation schemes differ from each other, an error occurs in the digital signal processing. In the first embodiment, however, the clock synchronization can be secured by using the same kHz frequency on the side transmitting the intensity-modulated optical signal C1 and on the side receiving the intensity-modulated optical signal C1. Further, the operation mode control unit 160 is capable of detecting the operation mode notification signal B2 in the intensity-modulated optical signal C1.

Figure 7:
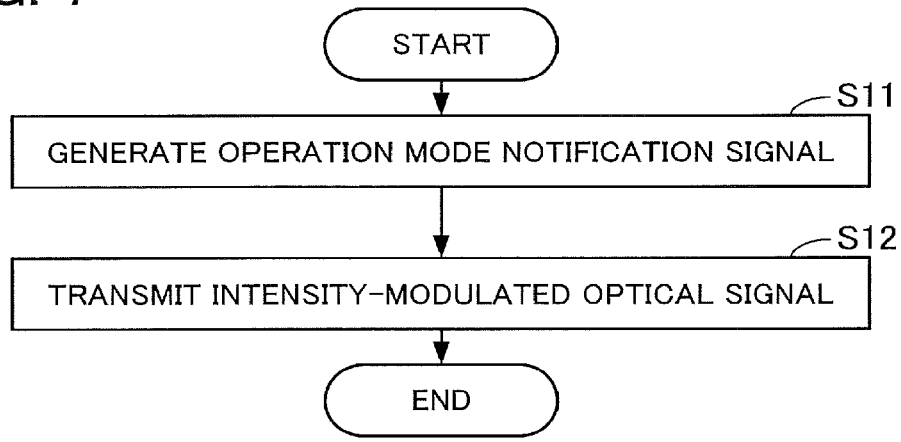
FIG. 7 is a flowchart showing the transmission process before entering a connection establishment state in the first embodiment.

FIG. 7 is a flowchart showing the transmission process before entering the connection establishment state in the first embodiment. While the transmission process executed by the optical transceiver 200 will be described with reference to FIG. 7, the transmission process executed by the optical transceiver 100 is also the same process. In FIG. 7, the process starts when the optical transceiver 200 starts up.

(Step S11) The operation mode control unit 260 acquires the operation mode B1 from the storage unit 250. The operation mode control unit 260 transmits the operation mode B1 to the low-rate signal generation unit 270.

The low-rate signal generation unit 270 receives the operation mode B1 from the operation mode control unit 260. The low-rate signal generation unit 270 generates the operation mode notification signal B2 at a kHz frequency based on the operation mode B1.

(Step S12) The optical modulation unit 233 generates the intensity-modulated optical signal C1 including the operation mode notification signal B2. The optical modulation unit 233 transmits the intensity-modulated optical signal C1 to the optical transceiver 100.

Figure 8:
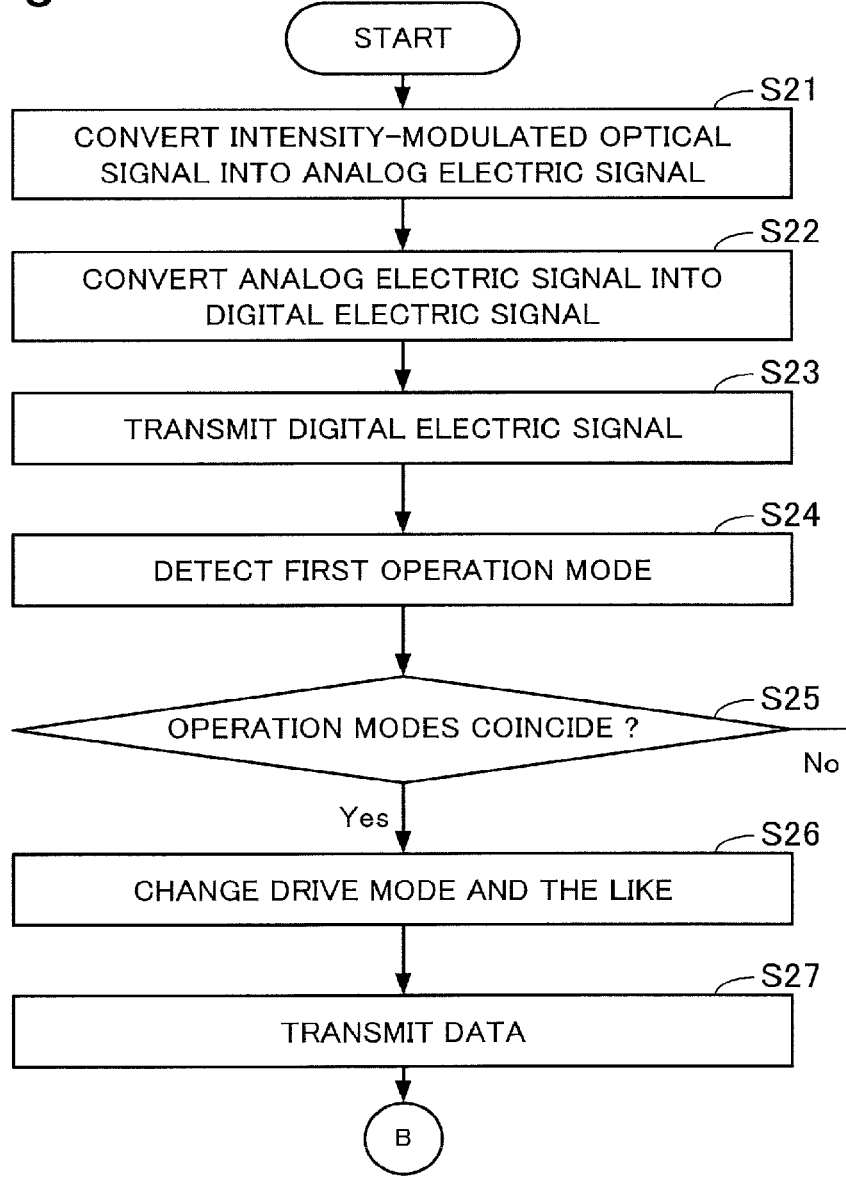
FIG. 8 is a flowchart (part 1) showing the reception process before entering the connection establishment state in the first embodiment.

FIG. 8 is a flowchart (part 1) showing the reception process before entering the connection establishment state in the first embodiment. While the reception process executed by the optical transceiver 100 will be described with reference to FIGS. 8 and 9, the reception process executed by the optical transceiver 200 is also the same process. In FIG. 8, the process starts when the reception unit 141a receives the intensity-modulated optical signal C1.

(Step S21) The reception unit 141a converts the intensity-modulated optical signal C1 including the operation mode notification signal B2 into the analog electric signal E1.

(Step S22) The A/D conversion unit 141b converts the analog electric signal E1 into the digital electric signal E2.

(Step S23) The data accumulation function unit 142 holds the digital electric signal E2. The data accumulation function unit 142 transmits the digital electric signal E2 to the operation mode control unit 160.

(Step S24) The operation mode control unit 160 detects the operation mode notification signal B2 in the digital electric signal E2. The operation mode control unit 160 refers to the operation mode table 151. The operation mode control unit 160 detects the first operation mode based on the operation mode notification signal B2.

(Step S25) The operation mode control unit 160 judges whether or not the first operation mode and the second operation mode coincide with each other. Namely, the operation mode control unit 160 judges whether or not the baud rate and the modulation scheme of the first operation mode and the baud rate and the modulation scheme of the second operation mode coincide with each other.

When the first operation mode and the second operation mode coincide with each other (Yes in the step S25), the operation mode control unit 160 advances the process to step S26. When the first operation mode and the second operation mode do not coincide with each other (No in the step S25), the operation mode control unit 160 advances the process to step S31.

(Step S26) The operation mode control unit 160 transmits the information F1 to the clock switching unit 143. The clock switching unit 143 selects the oscillator that generates the clock signal at the frequency based on the information F1 from the oscillators 144a, 144b and 144c. The clock switching unit 143 switches the oscillator from the oscillator 144a to the selected oscillator. The oscillator selected by the clock switching unit 143 outputs the clock signal to the A/D conversion unit 141b.

The operation mode control unit 160 transmits the information F2 to the digital signal processing unit 120. The digital signal processing unit 120 changes the drive mode based on the information F2.

The operation mode control unit 160 transmits the information F2 to the optical modulation unit 133. The optical modulation unit 133 changes the modulation scheme based on the information F2.

(Step S27) The operation mode control unit 160 notifies the client device via the electrical interface 110 that data communication is possible. The digital signal processing unit 120 receives a client signal from the client device via the electrical interface 110. The digital signal processing unit 120 performs the digital signal processing on the client signal. Thereafter, the transmission function unit 130 converts the electric signal into an optical signal. The transmission function unit 130 transmits the optical signal to the optical transceiver 200. Namely, the transmission function unit 130 transmits data (i.e., the client signal) converted into the optical signal to the optical transceiver 200. As above, data communication is started by the operation of the digital signal processing unit 120 and the transmission function unit 130.

Figure 9:
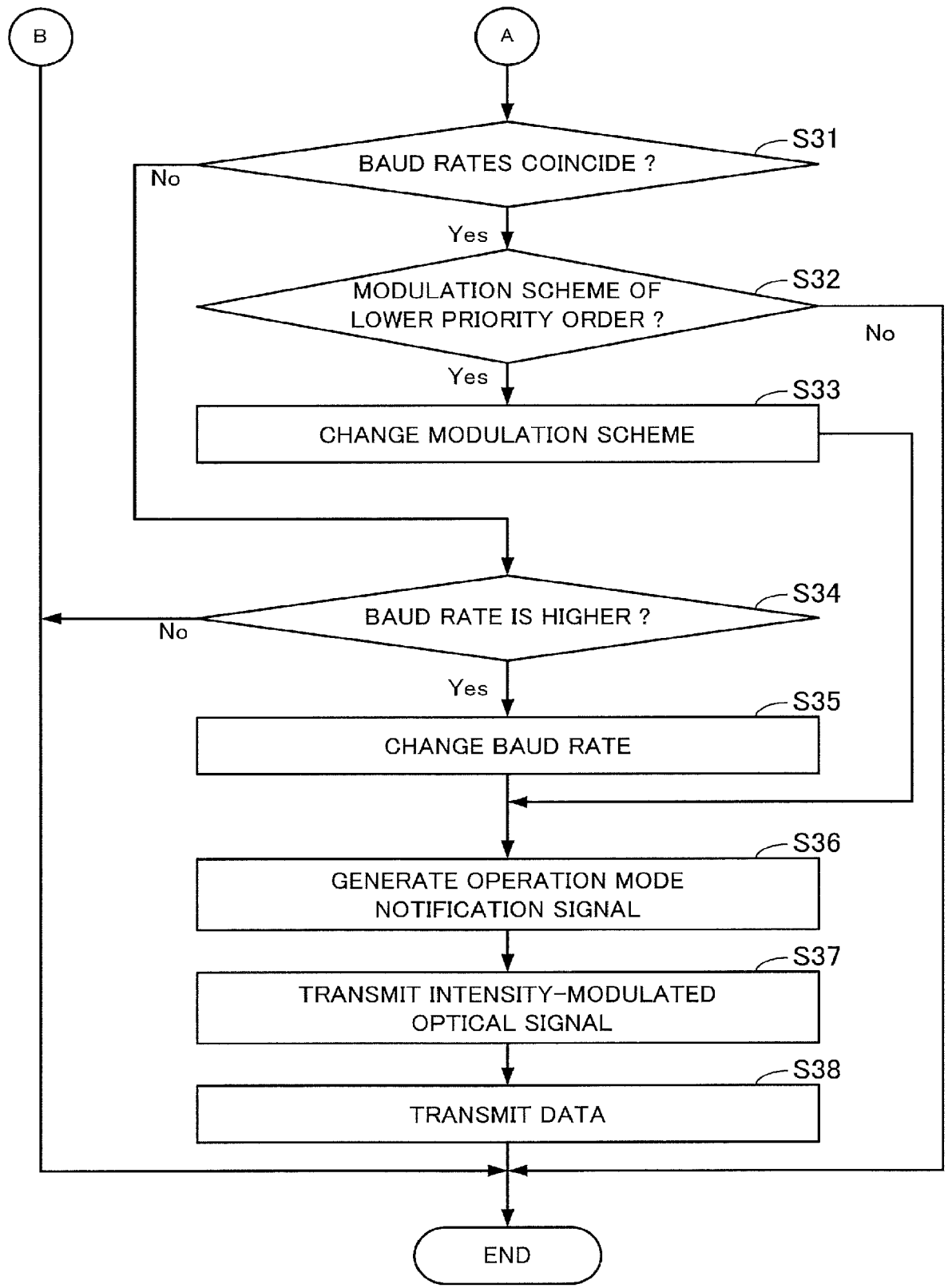
FIG. 9 is a flowchart (part 2) showing the reception process before entering the connection establishment state in the first embodiment.

FIG. 9 is a flowchart (part 2) showing the reception process before entering the connection establishment state in the first embodiment.

(Step S31) The operation mode control unit 160 judges whether or not the baud rate of the first operation mode and the baud rate of the second operation mode coincide with each other. When the baud rate of the first operation mode and the baud rate of the second operation mode coincide with each other (Yes in the step S31), the operation mode control unit 160 advances the process to step S32. When the baud rate of the first operation mode and the baud rate of the second operation mode do not coincide with each other (No in the step S31), the operation mode control unit 160 advances the process to step S34.

(Step S32) The operation mode control unit 160 judges whether or not the modulation scheme of the second operation mode is a modulation scheme of a lower priority order than the modulation scheme of the first operation mode. For example, the modulation scheme of the first operation mode is assumed to be No. 9 in the operation mode table 151. The modulation scheme of the second operation mode is assumed to be No. 10 in the operation mode table 151. In this case, the operation mode control unit 160 judges that the modulation scheme of the second operation mode is a modulation scheme of a lower priority order than the modulation scheme of the first operation mode.

When the condition is satisfied (Yes in the step S32), the operation mode control unit 160 advances the process to step S33. When the condition is not satisfied (No in the step S32), the operation mode control unit 160 ends the process.

(Step S33) The operation mode control unit 160 changes the modulation scheme of the second operation mode to the modulation scheme of the first operation mode. Then, the operation mode control unit 160 advances the process to step S36.

(Step S34) The operation mode control unit 160 judges whether or not the baud rate of the second operation mode is higher than the baud rate of the first operation mode. When the baud rate of the second operation mode is higher than the baud rate of the first operation mode (Yes in the step S34), the operation mode control unit 160 advances the process to step S35. When the baud rate of the second operation mode is lower than the baud rate of the first operation mode (No in the step S34), the operation mode control unit 160 ends the process. As above, the operation mode control unit 160 performs the control so as not to change the baud rate of the second operation mode to the baud rate of the first operation mode when the baud rate of the second operation mode is lower than the baud rate of the first operation mode.

(Step S35) The operation mode control unit 160 changes the baud rate of the second operation mode to the baud rate of the first operation mode. The operation mode control unit 160 changes the baud rate to the lower baud rate in consideration of characteristics of the transmission line 300, e.g., possibility of an increase in errors in cases of a QAM signal of a high multivalue level or the like.

The operation mode control unit 160 stores the operation mode after the change in the storage unit 150. It is also possible for the operation mode control unit 160 to retain the operation mode after the change in the operation mode control unit 160 itself.

(Step S36) The low-rate signal generation unit 170 generates the operation mode notification signal at a kHz frequency based on the operation mode after the change.

(Step S37) The optical modulation unit 133 generates the intensity-modulated optical signal including the operation mode notification signal. The optical modulation unit 133 transmits the intensity-modulated optical signal to the optical transceiver 200.

(Step S38) The operation mode control unit 160 notifies the client device via the electrical interface 110 that data communication is possible. The digital signal processing unit 120 receives a client signal from the client device via the electrical interface 110. The digital signal processing unit 120 performs the digital signal processing on the client signal. Thereafter, the transmission function unit 130 converts the electric signal into an optical signal. The transmission function unit 130 transmits the optical signal to the optical transceiver 200. Namely, the transmission function unit 130 transmits data (i.e., the client signal) converted into the optical signal to the optical transceiver 200. As above, data communication is started by the operation of the digital signal processing unit 120 and the transmission function unit 130.

Next, a transmission and reception process before entering the connection establishment state will be described briefly by showing concrete examples.

The following description will be given of a case where the baud rate of the operation mode stored in the storage unit 150 of the optical transceiver 100 (hereinafter referred to as "the operation mode of the optical transceiver 100") is higher than the baud rate of the operation mode stored in the storage unit 250 of the optical transceiver 200 (hereinafter referred to as "the operation mode of the optical transceiver 200"). Incidentally, the modulation scheme of the operation mode of the optical transceiver 100 and the modulation scheme of the operation mode of the optical transceiver 200 are assumed to be the same as each other.

When the optical transceiver 100 starts up, the optical transceiver 100 transmits the intensity-modulated optical signal including the operation mode notification signal to the optical transceiver 200 (steps S11 and S12). The optical transceiver 200 receives the intensity-modulated optical signal from the optical transceiver 100. The optical transceiver 200 judges that the operation modes do not coincide with each other (No in the step S25). The optical transceiver 200 does not change the operation mode of the optical transceiver 200 (No in the step S34).

When the optical transceiver 200 starts up, the optical transceiver 200 transmits the intensity-modulated optical signal including the operation mode notification signal to the optical transceiver 100 (steps S11 and S12). The optical transceiver 100 receives the intensity-modulated optical signal from the optical transceiver 200. The optical transceiver 100 judges that the operation modes do not coincide with each other (No in the step S25). The optical transceiver 100 changes the operation mode of the optical transceiver 100 to the operation mode of the optical transceiver 200 (step S35). Thus, the operation modes of the optical transceiver 100 and the optical transceiver 200 become the same. Namely, the optical transceiver 100 and the optical transceiver 200 enter the connection establishment state. The optical transceiver 100 transmits the intensity-modulated optical signal including the operation mode notification signal based on the operation mode after the change to the optical transceiver 200 (steps S36 and S37). The optical transceiver 100 transmits an optical signal obtained by converting a client signal to the optical transceiver 200 (step S38). The optical transceiver 200 receives the intensity-modulated optical signal from the optical transceiver 100. The optical transceiver 200 judges that the operation mode of the optical transceiver 100 and the operation mode of the optical transceiver 200 coincide with each other (Yes in the step S25). The optical transceiver 200 controls the clock switching unit, the digital signal processing unit and the optical modulation unit 233 of the optical transceiver 200 based on the operation mode of the optical transceiver 200 (step S26). The optical transceiver 200 transmits an optical signal obtained by converting a client signal to the optical transceiver 100 (step S27).

According to the first embodiment, the optical transceiver 100 changes the operation mode of the optical transceiver 100 to the operation mode of the optical transceiver 200 in the step S35. Thus, the operation modes of the optical transceiver 100 and the optical transceiver 200 become the same. Namely, the optical transceiver 100 and the optical transceiver 200 do not need to communicate information on the operation mode including a different baud rate a lot of times until their operation modes become the same as each other. Accordingly, the optical transceiver 100 is capable of entering the connection establishment state in a short time.

Next, a case where the baud rate of the operation mode of the optical transceiver 100 is lower than the baud rate of the operation mode of the optical transceiver 200 will be described below. Incidentally, the modulation scheme of the operation mode of the optical transceiver 100 and the modulation scheme of the operation mode of the optical transceiver 200 are assumed to be the same as each other.

When the optical transceiver 200 starts up, the optical transceiver 200 transmits the intensity-modulated optical signal including the operation mode notification signal to the optical transceiver 100 (steps S11 and S12). The optical transceiver 100 receives the intensity-modulated optical signal from the optical transceiver 200. The optical transceiver 100 judges that the operation modes do not coincide with each other (No in the step S25). The optical transceiver 100 does not change the operation mode of the optical transceiver 100 (No in the step S34).

When the optical transceiver 100 starts up, the optical transceiver 100 transmits the intensity-modulated optical signal including the operation mode notification signal to the optical transceiver 200 (steps S11 and S12). The optical transceiver 200 receives the intensity-modulated optical signal from the optical transceiver 100. The optical transceiver 200 judges that the operation modes do not coincide with each other (No in the step S25). The optical transceiver 200 changes the operation mode of the optical transceiver 200 to the operation mode of the optical transceiver 100 (step S35). Thus, the operation modes of the optical transceiver 100 and the optical transceiver 200 become the same. Namely, the optical transceiver 100 and the optical transceiver 200 enter the connection establishment state. The optical transceiver 200 transmits the intensity-modulated optical signal including the operation mode notification signal based on the operation mode after the change to the optical transceiver 100 (steps S36 and S37). The optical transceiver 200 transmits an optical signal obtained by converting a client signal to the optical transceiver 100 (step S38). The optical transceiver 100 receives the intensity-modulated optical signal from the optical transceiver 200.

The optical transceiver 100 judges that the operation mode of the optical transceiver 100 and the operation mode of the optical transceiver 200 coincide with each other (Yes in the step S25). The optical transceiver 100 controls the clock switching unit 143, the digital signal processing unit 120 and the optical modulation unit 133 based on the operation mode of the optical transceiver 100 (step S26). The optical transceiver 100 transmits an optical signal obtained by converting a client signal to the optical transceiver 200 (step S27).

When the judgment is No in the aforementioned step S34, the optical transceiver 100 does not change the operation mode of the optical transceiver 100. In the first embodiment, the optical transceiver 100 and the optical transceiver 200 are set to the same operation mode by changing only the operation mode of the optical transceiver 200 without changing the operation mode of the optical transceiver 100. Thus, in the first embodiment, the connection establishment state can be activated in a short time.

In the first embodiment, the baud rate and the modulation scheme are defined as the operation mode. However, it is also possible to define the transmission rate and the modulation scheme as the operation mode or to define the transmission rate as the operation mode. When the transmission rate and the modulation scheme are defined as the operation mode, the operation mode table 151 has columns of transmission rate, modulation scheme and operation mode notification signal. For example, in the step S34, the operation mode control unit 160 judges whether or not the transmission rate of the second operation mode is higher than the transmission rate of the first operation mode. When the transmission rate of the second operation mode is higher than the transmission rate of the first operation mode, the operation mode control unit 160 changes the transmission rate of the second operation mode to the transmission rate of the first operation mode in the step S35. Further, in the step S26, the operation mode control unit 160 transmits information F1 to the clock switching unit 143. The information F1 includes the transmission rate. The clock switching unit 143 selects an oscillator generating the clock signal at the frequency based on the information F1 from the oscillators 144a, 144b and 144c. The clock switching unit 143 switches the oscillator from the oscillator 144a to the selected oscillator. The oscillator selected by the clock switching unit 143 outputs the clock signal to the A/D conversion unit 141b.

Second Embodiment

Next, a second embodiment will be described below. In the second embodiment, features different from those in the first embodiment will be mainly described and description of common features will be omitted.

In the first embodiment, a case where the oscillator is switched to the oscillator 144a in order to receive the intensity-modulated optical signal has been described. Incidentally, the A/D conversion unit 141b has the 8-bit resolution in many cases. Thus, the data volume of the digital electric signal E2 is large when the A/D conversion unit 141b converts the analog electric signal E1 into the digital electric signal E2. The large data volume leads to a long processing time of the operation mode control unit 160. Therefore, in the second embodiment, a description will be given of a method employing a photodiode (PD) for low-rate signal reception which will be described below and an A/D conversion unit of a low-resolution.

Figure 10:
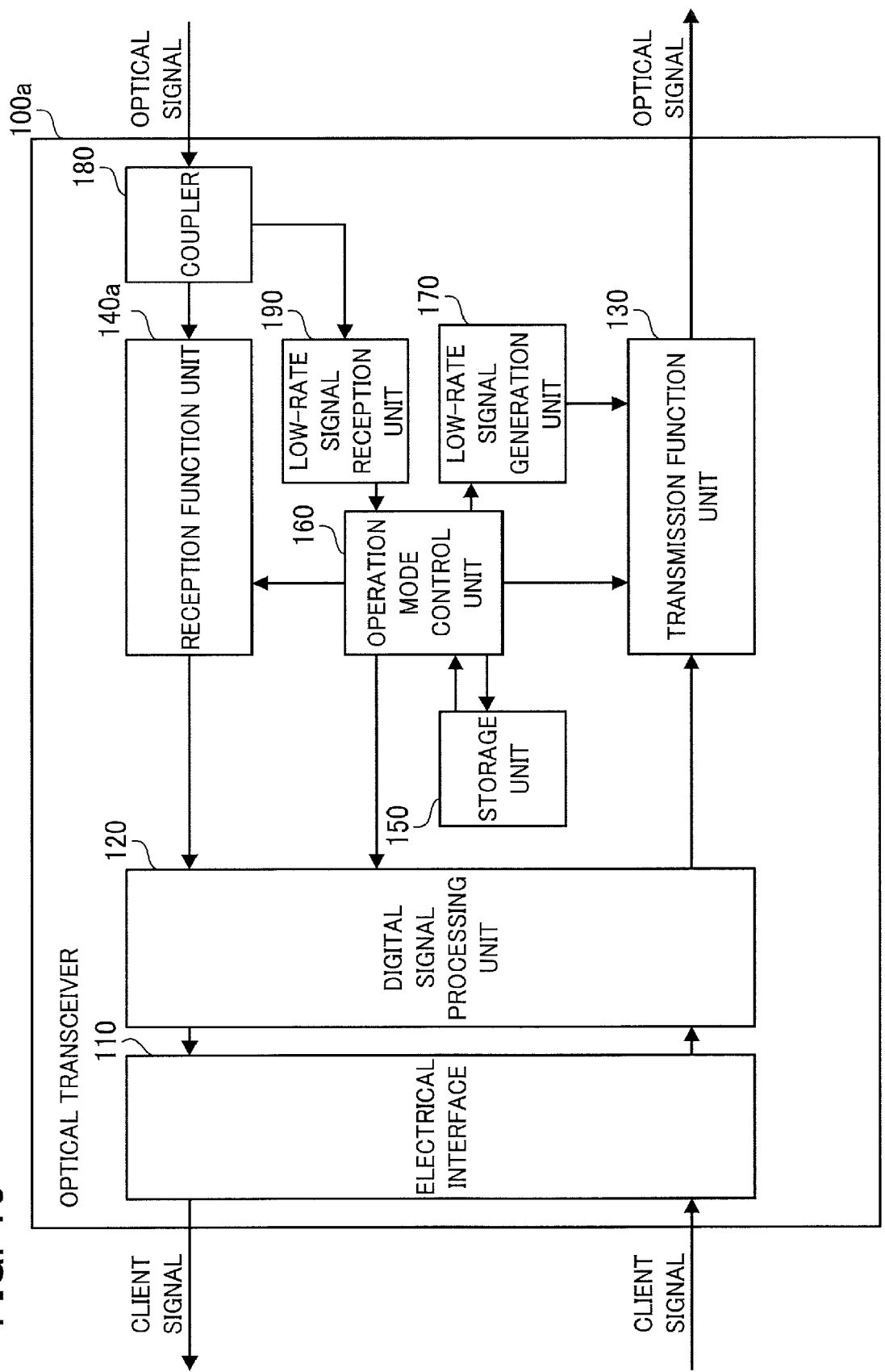
FIG. 10 is a functional block diagram showing a configuration of an optical transceiver in a second embodiment.

FIG. 10 is a functional block diagram showing a configuration of an optical transceiver in the second embodiment. The optical transceiver 100a includes a coupler 180 and a low-rate signal reception unit 190. An optical transceiver 200 has functional blocks similar to those of the optical transceiver 100a. Each component in FIG. 10 identical or corresponding to a component shown in FIG. 3 is assigned the same reference character as in FIG. 3. The second embodiment refers to FIG. 1 to FIG. 6.

Functions of the coupler 180 and the low-rate signal reception unit 190 will be described in detail later.

Figure 11:
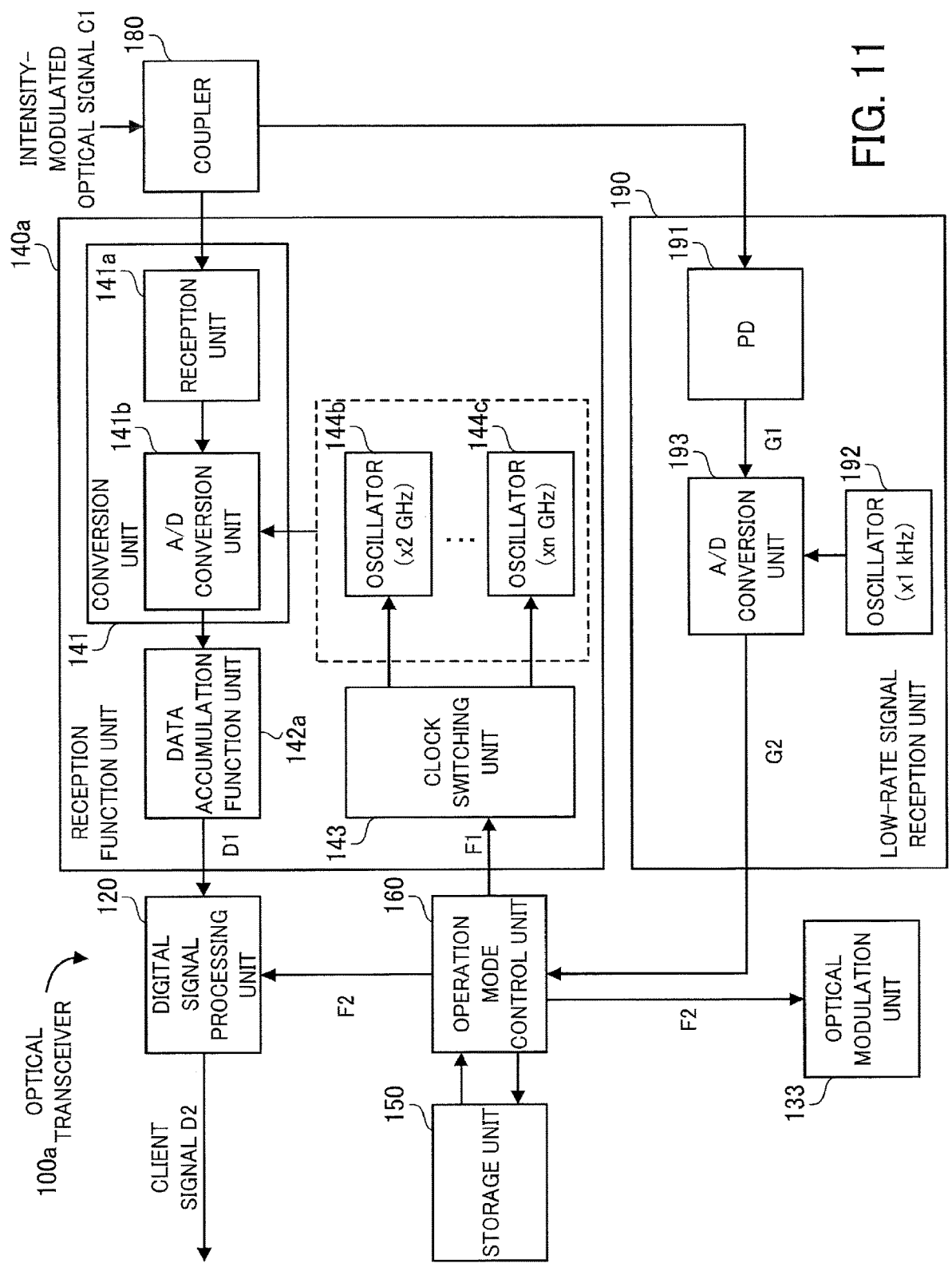
FIG. 11 is a diagram for explaining a reception process in the second embodiment.

FIG. 11 is a diagram for explaining a reception process in the second embodiment. A reception function unit 140a differs from the reception function unit 140 in not including the oscillator 144a. Further, a data accumulation function unit 142a does not transmit the digital electric signal E2 to the operation mode control unit 160. Each component in FIG. 11 identical or corresponding to a component shown in FIG. 6 is assigned the same reference character as in FIG. 6.

The coupler 180 transmits the intensity-modulated optical signal C1 to the low-rate signal reception unit 190. It is also possible to control the coupler 180 so as not to transmit the intensity-modulated optical signal C1 to the reception function unit 140a. Incidentally, the A/D conversion unit 141b will be referred to also as a first A/D conversion unit. Further, the resolution of the first A/D conversion unit will be referred to also as a first resolution.

The low-rate signal reception unit 190 includes a PD 191, an oscillator 192 and an A/D conversion unit 193. The PD 191 receives the intensity-modulated optical signal C1 including the operation mode notification signal. The PD 191 converts the intensity-modulated optical signal C1 into an analog electric signal G1.

The oscillator 192 outputs a clock signal at x1 [kHz] to the A/D conversion unit 193. The A/D conversion unit 193 converts the analog electric signal G1 into a digital electric signal G2. The resolution of the A/D conversion unit 193 is lower than the resolution of the A/D conversion unit 141b. For example, the resolution of the A/D conversion unit 193 may be 1 bit at the lowest. In other words, it is permissible if the A/D conversion unit 193 is capable of transmitting at least 1-bit information by performing modulation/demodulation once. The A/D conversion unit 193 transmits the digital electric signal G2 to the operation mode control unit 160. Incidentally, the digital electric signal G2 includes the operation mode notification signal.

The A/D conversion unit 193 will be referred to also as a second A/D conversion unit. Further, the resolution of the second A/D conversion unit will be referred to also as a second resolution.

In the second embodiment, the resolution of the A/D conversion unit 193 is lower than the resolution of the A/D conversion unit 141b. Therefore, the data volume of the digital electric signal G2 decreases compared to the case where the A/D conversion unit 141b converts the analog electric signal G1 into the digital electric signal. By the decrease in the data volume, the processing time of the operation mode control unit 160 can be shortened.

Third Embodiment

Next, a third embodiment will be described below. In the third embodiment, features different from those in the first embodiment will be mainly described and description of common features will be omitted.

In the first embodiment, a case where the optical transceiver 100 and the optical transceiver 200 store the same operation mode table has been described. In the third embodiment, a description will be given of a case where two optical transceivers store operation mode tables different from each other. The third embodiment refers to FIGS. 1 to 3, 5 and 6.

Figure 12:
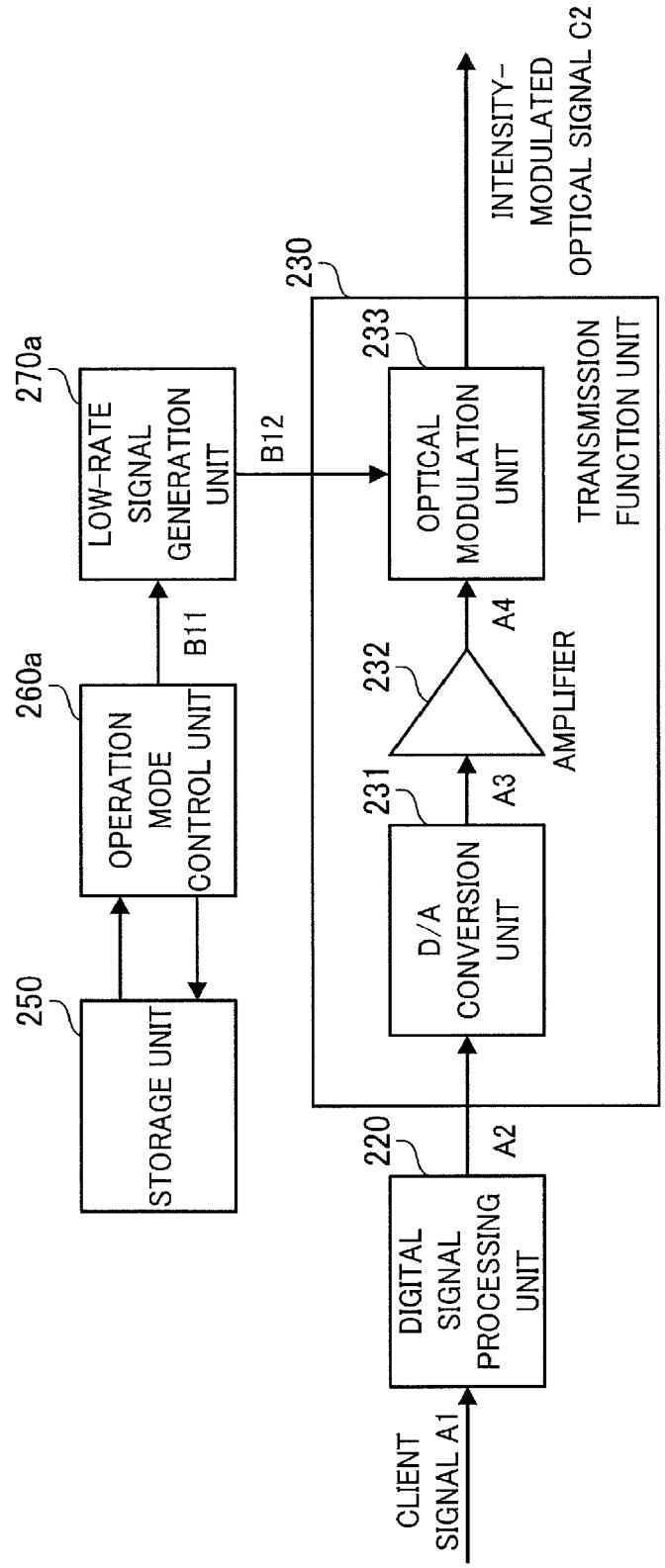
FIG. 12 is a diagram for explaining a transmission process in a third embodiment.

FIG. 12 is a diagram for explaining a transmission process in the third embodiment. An optical transceiver 200a includes an operation mode control unit 260a and a low-rate signal generation unit 270a. An optical transceiver 100b which will be described later has functional blocks similar to those of the optical transceiver 200a. Each component in FIG. 12 identical or corresponding to a component shown in FIG. 5 is assigned the same reference character as in FIG. 5. Functions of the operation mode control unit 260a and the low-rate signal generation unit 270a will be described in detail later.

Figure 13:
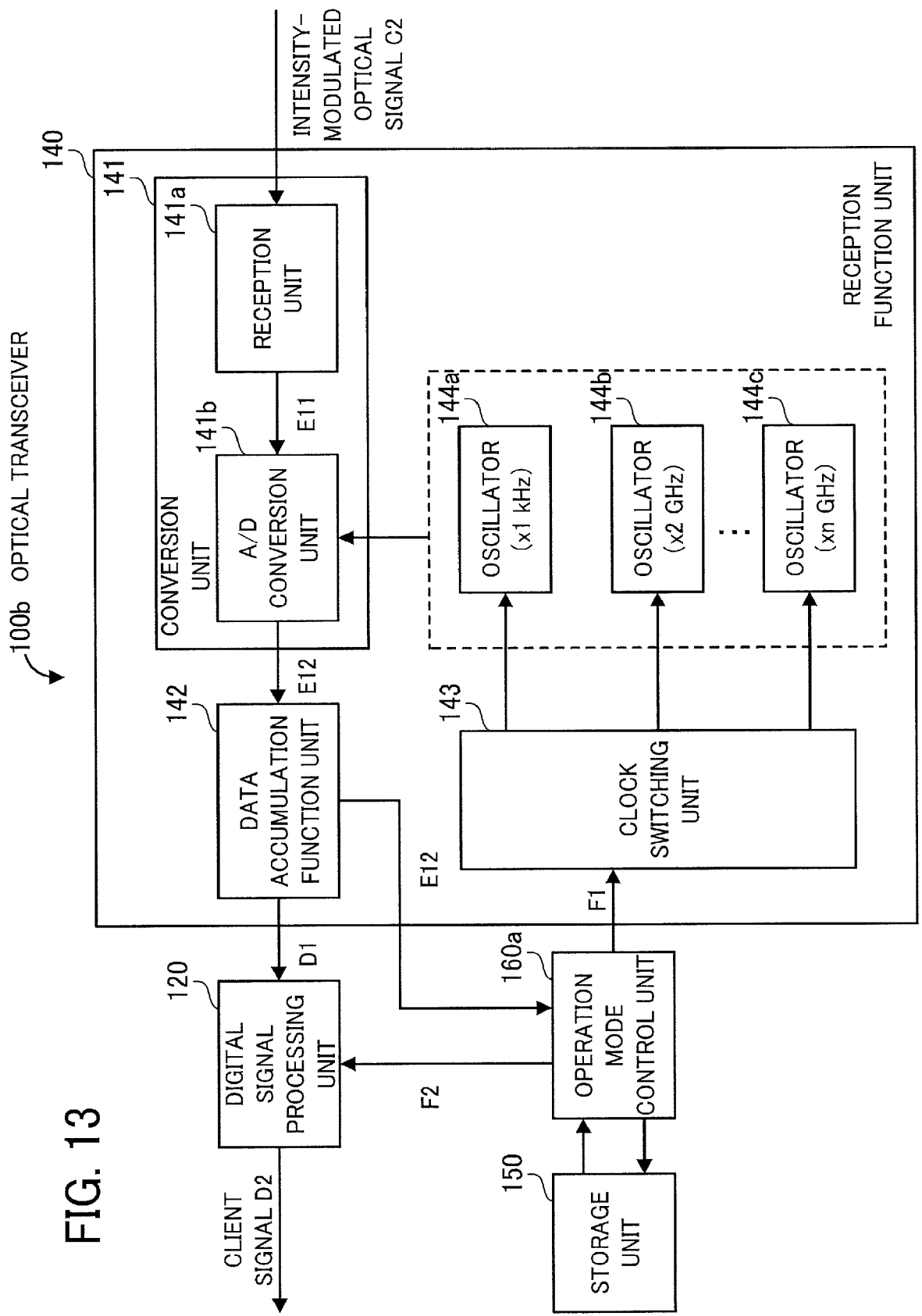
FIG. 13 is a diagram for explaining a reception process in the third embodiment.

FIG. 13 is a diagram for explaining a reception process in the third embodiment. The optical transceiver 100b includes an operation mode control unit 160a. The optical transceiver 200a has functional blocks similar to those of the optical transceiver 100b. Each component in FIG. 13 identical or corresponding to a component shown in FIG. 6 is assigned the same reference character as in FIG. 6. The function of the operation mode control unit 160a will be described in detail later.

Figure 14:
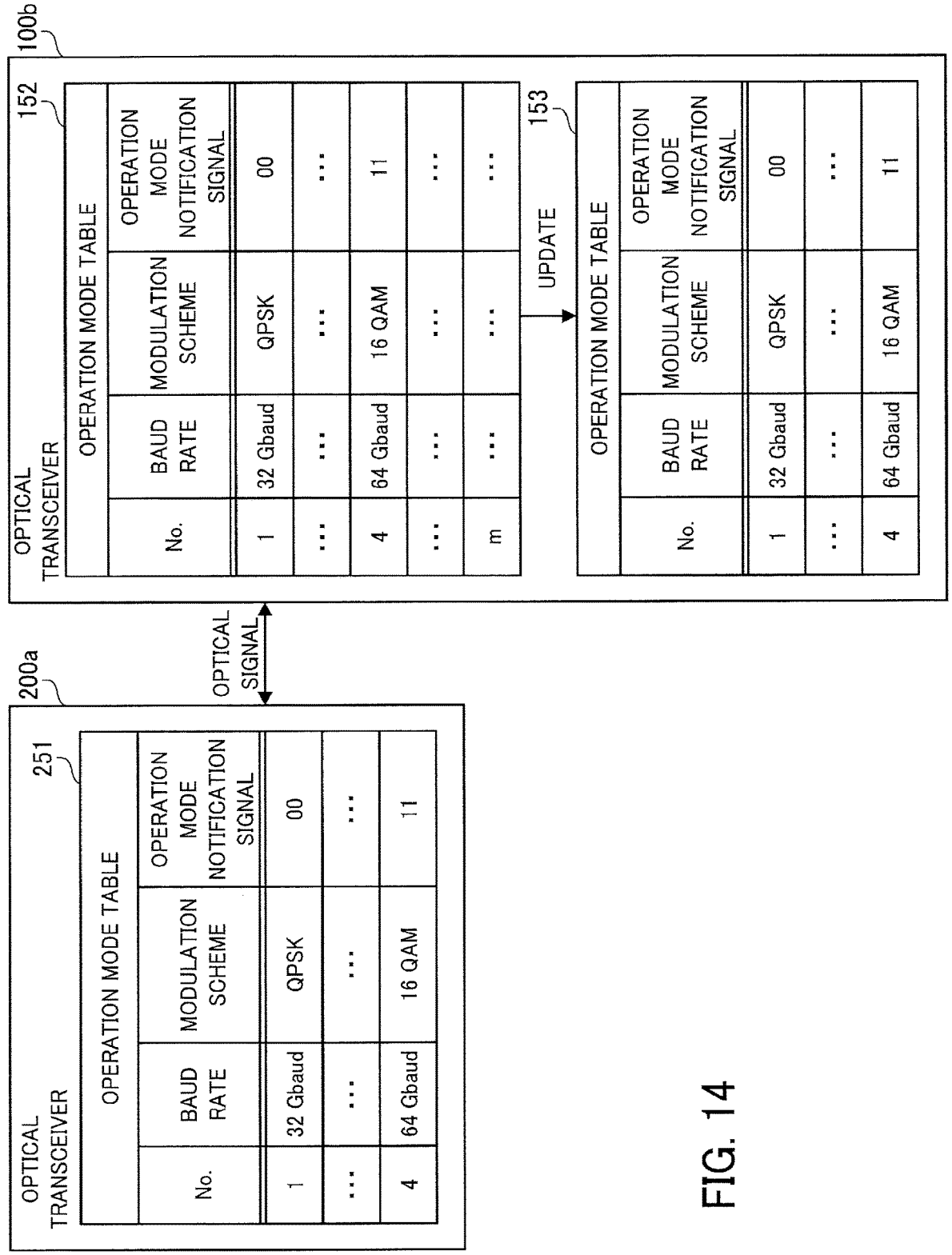
FIG. 14 is a diagram for explaining a case of storing different operation mode tables in the third embodiment.

FIG. 14 is a diagram for explaining a case of storing different operation mode tables in the third embodiment.

The optical transceiver 100b stores an operation mode table 152. The operation mode table 152 is stored in the storage unit 150. For example, the baud rate, the modulation scheme and the operation mode notification signal corresponding to each No. m (m is a positive integer) are registered in the operation mode table 152.

The optical transceiver 200a stores an operation mode table 251. The operation mode table 251 is stored in the storage unit 250. A version number of the operation mode table 152 is newer than that of the operation mode table 251.

Incidentally, an operation mode newly added to an operation mode table is registered in the lowermost row of the operation mode table.

In the third embodiment, when two optical transceivers have stored operation mode tables different from each other, the operation mode table having the newer version number is updated to the operation mode table having the older version number. In the example of FIG. 14, the operation mode control unit 160a deletes information in the operation mode table 152 in regard to the operation modes from No. 5. An operation mode table 153 shows the state after the deletion of the information in regard to the operation modes from No. 5. Consequently, the operation mode tables stored in the optical transceiver 100b and the optical transceiver 200a become the same as each other.

Figure 15:
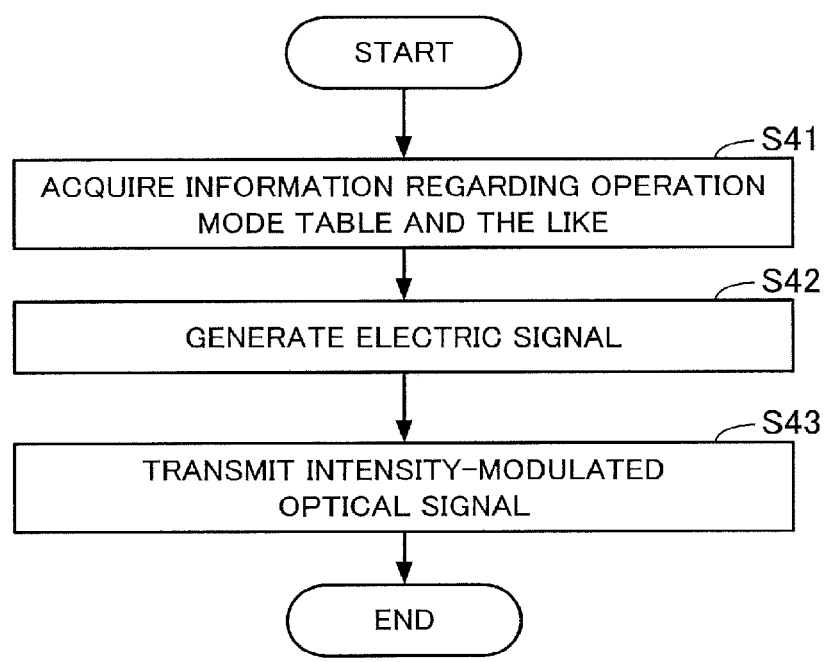
FIG. 15 is a flowchart showing the transmission process before entering the connection establishment state in the third embodiment.

FIG. 15 is a flowchart showing the transmission process before entering the connection establishment state in the third embodiment. While the transmission process executed by the optical transceiver 200a will be described with reference to FIG. 15, the transmission process executed by the optical transceiver 100b is also the same process. In FIG. 15, the process starts when the optical transceiver 200a starts up. The process of FIG. 15 will be explained below while referring to FIG. 12.

(Step S41) The operation mode control unit 260a acquires the version number of the operation mode table stored in the storage unit 250 and information regarding the operation mode table. The information regarding the operation mode table means the number of operation modes registered in the operation mode table (i.e., the number of registrations in the column of No.).

The operation mode control unit 260a acquires the operation mode from the storage unit 250. The operation mode control unit 260a transmits the version number of the operation mode table, the information regarding the operation mode table, and information B11 including the operation mode to the low-rate signal generation unit 270a.

(Step S42) The low-rate signal generation unit 270a receives the information B11 from the operation mode control unit 260a. The low-rate signal generation unit 270a generates an electric signal B12 at a kHz frequency including the operation mode notification signal based on the operation mode, the information regarding the operation mode table, and the version number of the operation mode table.

(Step S43) The optical modulation unit 233 generates an intensity-modulated optical signal C2 including the electric signal B12. The optical modulation unit 233 transmits the intensity-modulated optical signal C2 to the optical transceiver 100b.

As above, the optical transceiver 100b and the optical transceiver 200a transmit the intensity-modulated optical signal C2 including the version number of the operation mode table, the information regarding the operation mode table, and the operation mode notification signal to each other.

Figure 16:
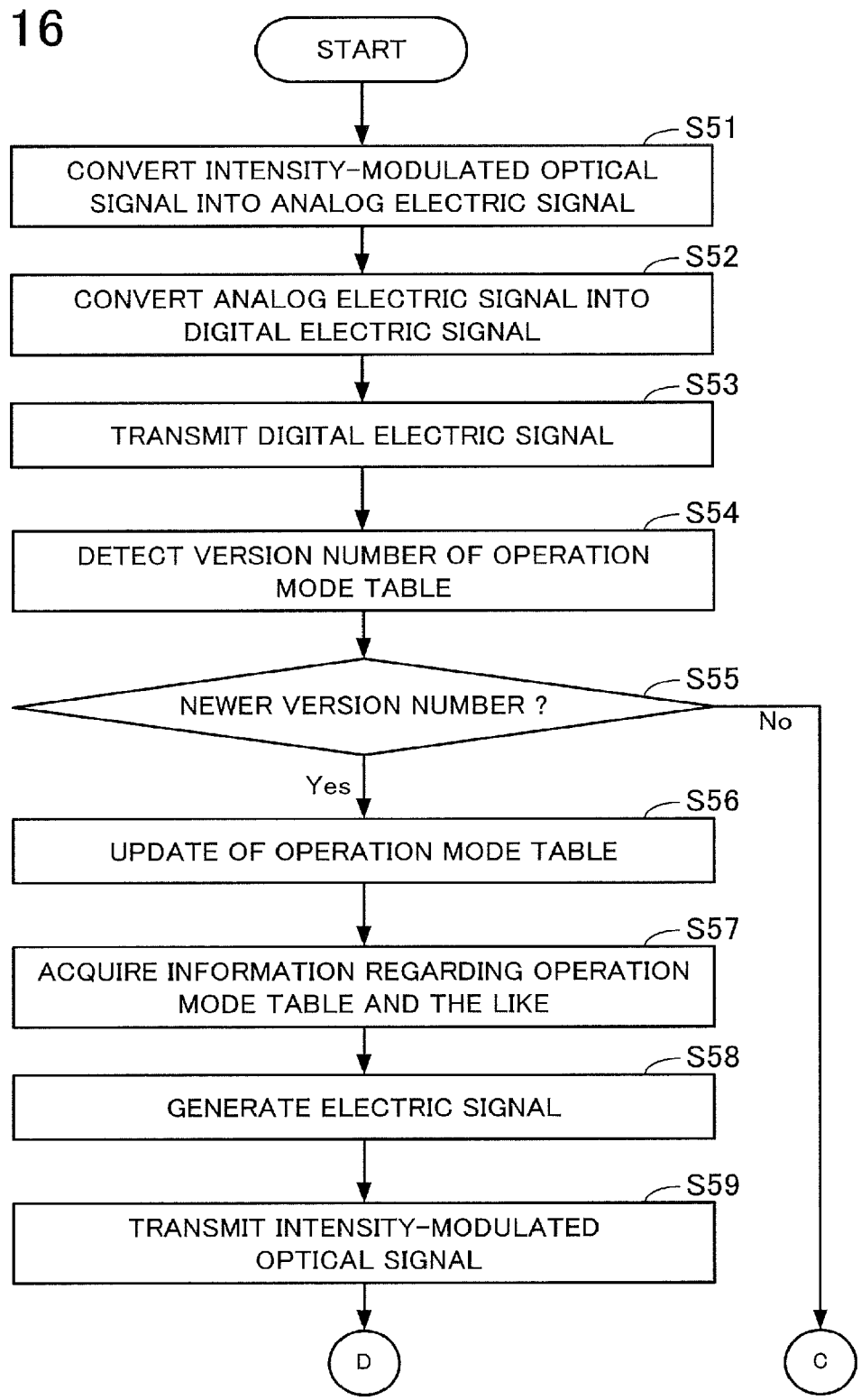
FIG. 16 is a flowchart (part 1) showing the reception process before entering the connection establishment state in the third embodiment.

FIG. 16 is a flowchart (part 1) showing the reception process before entering the connection establishment state in the third embodiment. While the reception process executed by the optical transceiver 100b will be described with reference to FIGS. 16 and 17, the reception process executed by the optical transceiver 200a is also the same process. In FIG. 16, the process starts when the reception unit 141a receives the intensity-modulated optical signal C2. The process of FIG. 16 will be explained below while referring to FIG. 13.

(Step S51) The reception unit 141a converts the intensity-modulated optical signal C2 into an analog electric signal E11.

(Step S52) The A/D conversion unit 141b converts the analog electric signal E11 into a digital electric signal E12.

(Step S53) The data accumulation function unit 142 holds the digital electric signal E12. The data accumulation function unit 142 transmits the digital electric signal E12 to the operation mode control unit 160a.

(Step S54) The operation mode control unit 160a detects the version number of the operation mode table stored in the storage unit 250 in the digital electric signal E12.

(Step S55) The operation mode control unit 160a detects the version number of the operation mode table stored in the storage unit 150. The operation mode control unit 160a judges whether or not the version number is newer than the version number detected in the step S54. When the condition is satisfied (Yes in the step S55), the operation mode control unit 160a advances the process to step S56. When the condition is not satisfied (No in the step S55), the operation mode control unit 160a advances the process to step S61.

(Step S56) The operation mode control unit 160a updates the operation mode table stored in the storage unit 150 to the operation mode table of the version number detected in the step S54. Namely, the operation mode control unit 160a updates the operation mode table stored in the storage unit 150 to the operation mode table of the older version number. Specifically, the operation mode control unit 160a detects the information regarding the operation mode table in the digital electric signal E12. The operation mode control unit 160a determines the number of operation modes registered in the operation mode table stored in the storage unit 250

(i.e., the number of registrations in the column of No.) based on the information regarding the operation mode table. The operation mode control unit 160a updates the operation mode table stored in the storage unit 150 based on the number of operation modes registered in the operation mode table stored in the storage unit 250. Consequently, the operation mode tables of the optical transceiver 100b and the optical transceiver 200a become the same as each other.

Further, when an operation mode in the operation mode table stored in the storage unit 150 is included in the operation mode table stored in the storage unit 250, the operation mode control unit 160a updates the operation mode table stored in the storage unit 150 while maintaining set values of the operation mode in the operation mode table stored in the storage unit 150. When no operation mode in the operation mode table stored in the storage unit 150 is included in the operation mode table stored in the storage unit 250, the operation mode control unit 160a updates the operation mode table stored in the storage unit 150 to the operation mode table stored in the storage unit 250. Then, the operation mode control unit 160a newly selects an operation mode from the updated operation mode table.

(Step S57) The operation mode control unit 160a acquires the version number of the operation mode table stored in the storage unit 150 and the information regarding the operation mode table.

The operation mode control unit 160a acquires the operation mode from the storage unit 150. The operation mode control unit 160a transmits the version number of the operation mode table, the information regarding the operation mode table, and information including the operation mode to the low-rate signal generation unit 170.

(Step S58) The low-rate signal generation unit 170 generates an electric signal at a kHz frequency including the operation mode notification signal based on the operation mode, the information regarding the operation mode table, and the version number of the operation mode table.

(Step S59) The optical modulation unit 133 generates an intensity-modulated optical signal including the electric signal. The optical modulation unit 133 transmits the intensity-modulated optical signal to the optical transceiver 200a. Then, the optical modulation unit 133 advances the process to step S62.

Figure 17:
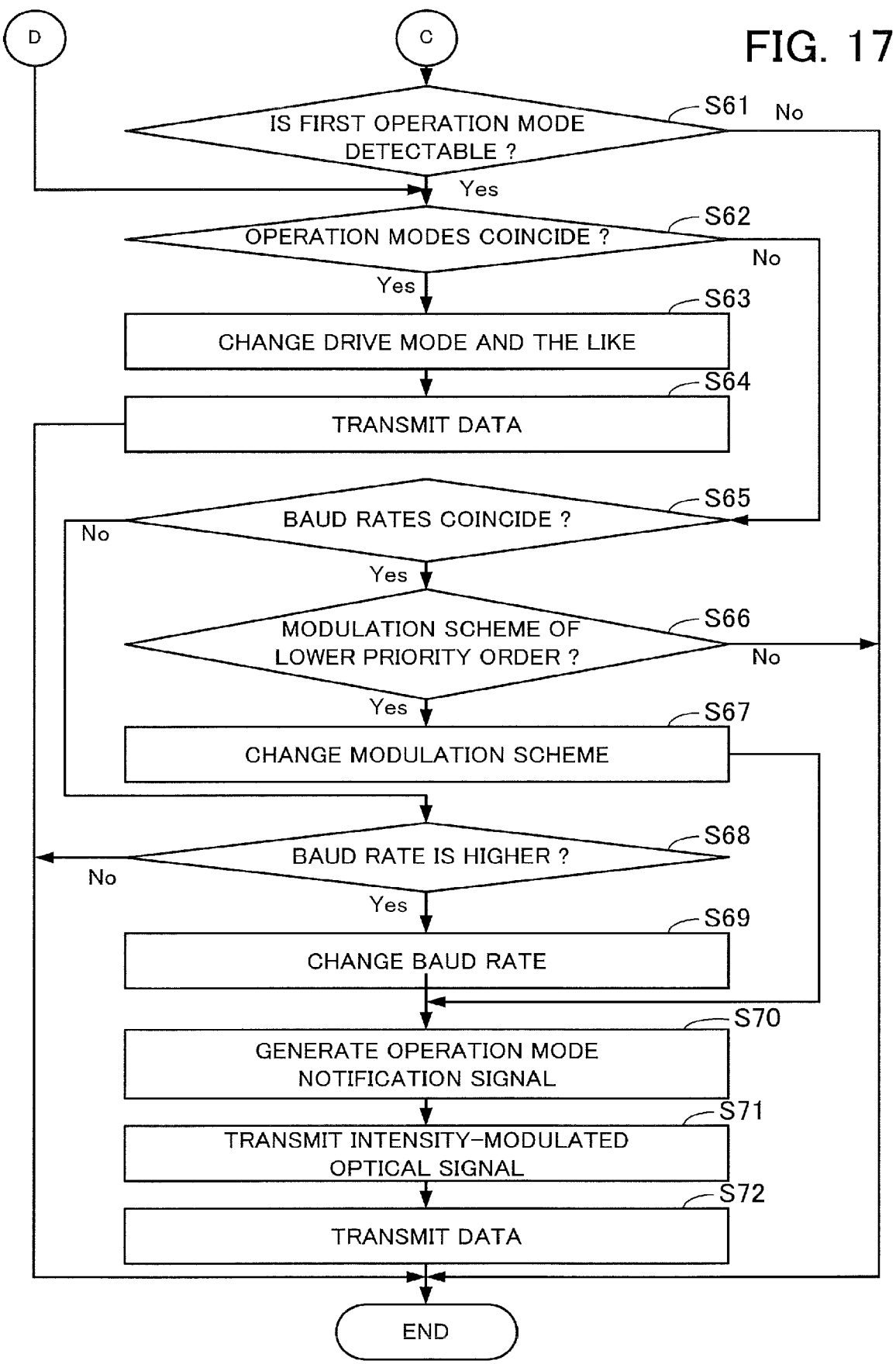
FIG. 17 is a flowchart (part 2) showing the reception process before entering the connection establishment state in the third embodiment.

FIG. 17 is a flowchart (part 2) showing the reception process before entering the connection establishment state in the third embodiment.

(Step S61) The operation mode control unit 160a detects the operation mode notification signal in the digital electric signal E12. The operation mode control unit 160a judges whether or not the first operation mode based on the operation mode notification signal is detectable in the operation mode table stored in the storage unit 150. When it is detectable (Yes in the step S61), the operation mode control unit 160a advances the process to the step S62. When it is not detectable (No in the step S61), the operation mode control unit 160a ends the process.

(Step S62) The operation mode control unit 160a judges whether or not the first operation mode and the second operation mode coincide with each other. When the first operation mode and the second operation mode coincide with each other (Yes in the step S62), the operation mode control unit 160a advances the process to step S63. When the first operation mode and the second operation mode do not coincide with each other (No in the step S62), the operation mode control unit 160a advances the process to step S65.

(Step S63) The operation mode control unit 160a transmits the information F1 to the clock switching unit 143. The clock switching unit 143 selects the oscillator generating the clock signal at the frequency based on the information F1 from the oscillators 144a, 144b and 144c. The clock switching unit 143 switches the oscillator from the oscillator 144a to the selected oscillator. The oscillator selected by the clock switching unit 143 outputs the clock signal to the A/D conversion unit 141b.

The operation mode control unit 160a transmits the information F2 to the digital signal processing unit 120. The digital signal processing unit 120 changes the drive mode based on the information F2.

The operation mode control unit 160a transmits the information F2 to the optical modulation unit 133. The optical modulation unit 133 changes the modulation scheme based on the information F2.

(Step S64) The operation mode control unit 160a notifies the client device via the electrical interface 110 that data communication is possible. The digital signal processing unit 120 receives a client signal from the client device via the electrical interface 110. The digital signal processing unit 120 performs the digital signal processing on the client signal. Thereafter, the transmission function unit 130 converts the electric signal into an optical signal. The transmission function unit 130 transmits the optical signal to the optical transceiver 200a. Namely, the transmission function unit 130 transmits data (i.e., the client signal) converted into the optical signal to the optical transceiver 200a. As above, data communication is started by the operation of the digital signal processing unit 120 and the transmission function unit 130.

(Step S65) The operation mode control unit 160a judges whether or not the baud rate of the first operation mode and the baud rate of the second operation mode coincide with each other. When the baud rate of the first operation mode and the baud rate of the second operation mode coincide with each other (Yes in the step S65), the operation mode control unit 160a advances the process to step S66. When the baud rate of the first operation mode and the baud rate of the second operation mode do not coincide with each other (No in the step S65), the operation mode control unit 160a advances the process to step S68.

(Step S66) The operation mode control unit 160a judges whether or not the modulation scheme of the second operation mode is a modulation scheme of a lower priority order than the modulation scheme of the first operation mode. When the condition is satisfied (Yes in the step S66), the operation mode control unit 160a advances the process to step S67. When the condition is not satisfied (No in the step S66), the operation mode control unit 160a ends the process.

(Step S67) The operation mode control unit 160a changes the modulation scheme of the second operation mode to the modulation scheme of the first operation mode. Then, the operation mode control unit 160a advances the process to step S70.

(Step S68) The operation mode control unit 160a judges whether or not the baud rate of the second operation mode is higher than the baud rate of the first operation mode. When the baud rate of the second operation mode is higher than the baud rate of the first operation mode (Yes in the step S68), the operation mode control unit 160a advances the process to step S69. When the baud rate of the second operation mode is lower than the baud rate of the first operation mode (No in the step S68), the operation mode control unit 160a ends the process.

(Step S69) The operation mode control unit 160*a* changes the baud rate of the second operation mode to the baud rate of the first operation mode.

The operation mode control unit 160*a* stores the operation mode after the change in the storage unit 150. It is also possible for the operation mode control unit 160*a* to retain the operation mode after the change in the operation mode control unit 160*a* itself.

(Step S70) The low-rate signal generation unit 170 generates the operation mode notification signal at a kHz frequency based on the operation mode after the change.

(Step S71) The optical modulation unit 133 generates the intensity-modulated optical signal including the operation mode notification signal. The optical modulation unit 133 transmits the intensity-modulated optical signal to the optical transceiver 200*a*.

(Step S72) The operation mode control unit 160*a* notifies the client device via the electrical interface 110 that data communication is possible. The digital signal processing unit 120 receives a client signal from the client device via the electrical interface 110. The digital signal processing unit 120 performs the digital signal processing on the client signal. Thereafter, the transmission function unit 130 converts the electric signal into an optical signal. The transmission function unit 130 transmits the optical signal to the optical transceiver 200*a*. Namely, the transmission function unit 130 transmits data (i.e., the client signal) converted into the optical signal to the optical transceiver 200*a*. As above, data communication is started by the operation of the digital signal processing unit 120 and the transmission function unit 130.

According to the third embodiment, the optical transceiver 100*b* and the optical transceiver 200*a* enter the connection establishment state by synchronizing their operation modes after the version numbers of the operation mode tables have become the same as each other.

Features in the embodiments described above can be appropriately combined with each other.

DESCRIPTION OF REFERENCE CHARACTERS

100, 100*a*, 100*b*: optical transceiver (optical communication device), 110: electrical interface, 120: digital signal processing unit, 130: transmission function unit, 133: optical modulation unit, 140, 140*a*: reception function unit, 141: conversion unit, 141*a*: reception unit, 141*b*: A/D conversion unit, 142, 142*a*: data accumulation function unit, 143: clock switching unit, 144*a*, 144*b*, 144*c*: oscillator, 150: storage unit, 160, 160*a*: operation mode control unit, 170: low-rate signal generation unit, 180: coupler, 190: low-rate signal reception unit, 191: PD, 192: oscillator, 193: A/D conversion unit, 200, 200*a*, 200*b*: optical transceiver, 220: digital signal processing unit, 230: transmission function unit, 231: D/A conversion unit, 232: amplifier, 233: optical modulation unit, 250: storage unit, 260, 260*a*: operation mode control unit, 270, 270*a*: low-rate signal generation unit, 300: transmission line

What is claimed is:

1. An optical communication device that communicates with a first optical communication device, comprising:
    a converter configured to receive an optical signal transmitted from the first optical communication device and to convert the optical signal into a digital electric signal based on a clock signal;
    a clock switch configured to switch an oscillator generating the clock signal; and
    an operation mode controller configured to detect an operation mode of the first optical communication device in the digital electric signal and to command the clock switch to perform switching from the oscillator generating the clock signal to an oscillator generating a clock signal at a frequency based on the operation mode of the first optical communication device,
    wherein when a baud rate represented by the operation mode stored in a memory is higher than a baud rate represented by the operation mode of the first optical communication device, the operation mode controller is further configured to perform a first control so as to change the baud rate represented by the operation mode stored in the memory to the baud rate represented by the operation mode of the first optical communication device and command the clock switch to perform switching from the oscillator generating the clock signal to an oscillator generating a clock signal at a frequency based on the baud rate represented by the operation mode after the change,
    wherein the operation mode controller is further configured to perform a second control, different from the first control, of the baud rate represented by the operation mode stored in the memory when the baud rate represented by the operation mode stored in the memory is lower than the baud rate represented by the operation mode of the first optical communication device.

2. The optical communication device according to claim 1, wherein when the baud rate represented by the operation mode stored in the memory is lower than the baud rate represented by the operation mode of the first optical communication device, the operation mode controller is further configured to perform the second control so as not to change the baud rate represented by the operation mode stored in the memory to the baud rate represented by the operation mode of the first optical communication device.

3. The optical communication device according to claim 1, further comprising:
    a digital signal processor configured to perform digital signal processing; and
    an optical modulator configured to modulate an optical signal to be transmitted, wherein
    when a priority order of a modulation scheme represented by the operation mode stored in the memory is lower than a priority order of a modulation scheme represented by the operation mode of the first optical communication device,
    the operation mode controller is further configured to change the modulation scheme represented by the operation mode stored in the memory to the modulation scheme represented by the operation mode of the first optical communication device and transmit the modulation scheme after the change to the digital signal processor and the optical modulator,
    the digital signal processor is further configured to change a drive mode based on the modulation scheme after the change, and
    the optical modulator is further configured to change a scheme of the modulating based on the modulation scheme after the change.

4. The optical communication device according to claim 1, further comprising a transmitter configured to transmit information indicating the operation mode stored in the memory to the first optical communication device.

5. The optical communication device according to claim 1, further comprising a first oscillator configured to generate oscillation at a kHz frequency at a first numerical value, wherein
the clock switch is further configured to switch the oscillator to the first oscillator when the converter converts the optical signal into the digital electric signal, and
the first oscillator is further configured to generate and supply a clock signal at the kHz frequency at the first numerical value to the converter.

6. The optical communication device according to claim 1, wherein
the converter includes a first A/D converter configured to convert an analog electric signal obtained by converting the optical signal, into the digital electric signal,
the first A/D converter has a first resolution, and
the optical communication device further includes:
a second A/D converter having a second resolution lower than the first resolution;
a photodiode configured to convert the optical signal into an analog electric signal; and
a coupler configured to receive the optical signal prior to the converter, wherein
the coupler receiving the optical signal is further configured to transmit the optical signal to the photodiode, and
the second A/D converter is further configured to receive the analog electric signal obtained by converting the optical signal from the photodiode, convert the received analog electric signal into a digital electric signal, and transmit the digital electric signal obtained by the conversion to the operation mode controller.

7. The optical communication device according to claim 1, wherein the memory is further configured to store an operation mode table indicating a plurality of operation modes and a version number of the operation mode table,
wherein the operation mode controller is further configured to detect information regarding an operation mode table stored in the first optical communication device and a version number of the operation mode table stored in the first optical communication device in the digital electric signal, and update the operation mode table stored in the memory based on the information regarding the operation mode table stored in the first optical communication device when the version number of the operation mode table stored in the memory is newer than the version number of the operation mode table stored in the first optical communication device.

8. The optical communication device according to claim 7, further comprising a transmitter configured to transmit the version number of the operation mode table stored in the memory and information regarding the operation mode table to the first optical communication device.

9. A control method performed by an optical communication device communicating with a first optical communication device, the control method comprising:
receiving an optical signal transmitted from the first optical communication device;
converting the optical signal into a digital electric signal based on a clock signal;
detecting an operation mode of the first optical communication device in the digital electric signal;
performing switching from an oscillator generating the clock signal to an oscillator generating a clock signal at a frequency based on the operation mode of the first optical communication device;
performing a first control so as to change a baud rate represented by the operation mode stored in a memory to a baud rate represented by the operation mode of the first optical communication device when the baud rate represented by the operation mode stored in the memory is higher than the baud rate represented by the operation mode of the first optical communication device and commanding the clock switch to perform switching from the oscillator generating the clock signal to an oscillator generating a clock signal at a frequency based on the baud rate represented by the operation mode after the change, and
performing a second control, different from the first control, of the baud rate represented by the operation mode stored in the memory when the baud rate represented by the operation mode stored in the memory is lower than the baud rate represented by the operation mode of the first optical communication device.

10. An optical communication device that communicates with a first optical communication device, the optical communication device comprising:
a processor to execute a program; and
a memory to store the program which, when executed by the processor, performs
receiving an optical signal transmitted from the first optical communication device;
converting the optical signal into a digital electric signal based on a clock signal;
detecting an operation mode of the first optical communication device in the digital electric signal;
performing switching from an oscillator generating the clock signal to an oscillator generating a clock signal at a frequency based on the operation mode of the first optical communication device;
performing a first control so as to change a baud rate represented by the operation mode stored in a memory to a baud rate represented by the operation mode of the first optical communication device when the baud rate represented by the operation mode stored in the memory is higher than the baud rate represented by the operation mode of the first optical communication device and commanding the clock switch to perform switching from the oscillator generating the clock signal to an oscillator generating a clock signal at a frequency based on the baud rate represented by the operation mode after the change, and
performing a second control, different from the first control, of the baud rate represented by the operation mode stored in the memory when the baud rate represented by the operation mode stored in the memory is lower than the baud rate represented by the operation mode of the first optical communication device.

* * * * *